US012520414B2

(12) United States Patent
Michan et al.

(10) Patent No.: US 12,520,414 B2
(45) Date of Patent: Jan. 6, 2026

(54) DRIVE CIRCUIT FOR A DIELECTRIC BARRIER DISCHARGE DEVICE AND METHOD OF CONTROLLING THE DISCHARGE IN A DIELECTRIC BARRIER DISCHARGE

(71) Applicant: DAPHNE TECHNOLOGY SA, Ecublens (CH)

(72) Inventors: Juan Mario Michan, Saint-Sulpice (CH); William Jamieson Ramsay, Saint-Sulpice (CH); Dominik Neumayr, Saint-Sulpice (CH)

(73) Assignee: DAPHNE TECHNOLOGY SA, Ecublens (CH)

(*) Notice: Subject to any disclaimer, the term of this patent is extended or adjusted under 35 U.S.C. 154(b) by 246 days.

(21) Appl. No.: 18/252,764

(22) PCT Filed: Nov. 19, 2021

(86) PCT No.: PCT/EP2021/082310
§ 371 (c)(1),
(2) Date: May 12, 2023

(87) PCT Pub. No.: WO2022/106622
PCT Pub. Date: May 27, 2022

(65) Prior Publication Data

US 2024/0008162 A1 Jan. 4, 2024

(30) Foreign Application Priority Data

Nov. 19, 2020 (GB) ..................................... 2018200
Jul. 16, 2021 (GB) ..................................... 2110270

(51) Int. Cl.
*H05H 1/24* (2006.01)

(52) U.S. Cl.
CPC ....... *H05H 1/2406* (2013.01); *H05H 2242/20* (2021.05)

(58) Field of Classification Search
CPC ........... H05H 2242/20; H05H 2242/22; H05H 1/2406; H01J 37/32348
See application file for complete search history.

(56) References Cited

U.S. PATENT DOCUMENTS 4,495,043 A 1/1985 Marets
4,680,694 A 7/1987 Huynh et al.
(Continued)

FOREIGN PATENT DOCUMENTS

CN 104205604 A 12/2014
DE 112017001909 T5 * 12/2018 ............. H02M 7/48
(Continued)

OTHER PUBLICATIONS

"International Search Report and Written Opinion of the International Searching Authority", International Application No. PCT/EP2021/082310, Feb. 18, 2022, 16 pp.
(Continued)

*Primary Examiner* — Patrick C Chen
(74) *Attorney, Agent, or Firm* — Myers Bigel, P.A.

(57) ABSTRACT

There is provided a drive circuit for a dielectric barrier discharge device. The drive circuit comprises: a power supply connectable in use across a dielectric discharge gap, the dielectric discharge gap providing a capacitance; and an inductance between the power supply and the dielectric discharge gap when connected thereby establishing a resonant tank in use, wherein power is provided in use to the tank in pulse-trains and only during a pulse-train, a pulse frequency of each pulse-train being tuneable in use to a resonant frequency of the tank, power provided by each pulse-train charging and maintaining the tank to a threshold
(Continued)

at which discharge ignition occurs, discharge ignition events per pulse-train being limited to a maximum number based on the drive circuit being arranged in use to prohibit each pulse-train transferring power to the resonant tank after the maximum number has occurred.

20 Claims, 17 Drawing Sheets

(56) References Cited

U.S. PATENT DOCUMENTS

| | | | | |
|---|---|---|---|---|
| 4,713,220 | A * | 12/1987 | Huynh | C01B 13/115 363/136 |
| 5,130,003 | A | 7/1992 | Conrad | |
| 6,451,267 | B1 | 9/2002 | Ayad et al. | |
| 7,911,150 | B2 | 3/2011 | Shannon et al. | |
| 2001/0023743 | A1 | 9/2001 | Savas | |
| 2005/0199484 | A1 | 9/2005 | Olstowski | |
| 2008/0258640 | A1 | 10/2008 | Masuda | |
| 2008/0303448 | A1 | 12/2008 | Huang et al. | |
| 2009/0297409 | A1 | 12/2009 | Buchanan et al. | |
| 2013/0257311 | A1* | 10/2013 | Tran | H05B 45/00 315/279 |
| 2016/0278197 | A1* | 9/2016 | Kamata | H01F 27/2823 |
| 2020/0053862 | A1 | 2/2020 | Shiohara et al. | |
| 2020/0305265 | A1* | 9/2020 | Eckert | H05H 1/2406 |

FOREIGN PATENT DOCUMENTS

| | | | |
|---|---|---|---|
| JP | 2009059526 | A | 3/2009 |
| JP | 2010035402 | A * | 2/2010 |
| JP | 2015514385 | A | 5/2015 |
| JP | 2016178287 | A | 10/2016 |
| JP | 2017192282 | A | 10/2017 |
| KR | 20140148443 | A | 12/2014 |
| WO | 9948807 | A1 | 9/1999 |
| WO | 2013148390 | A1 | 10/2013 |
| WO | 2017147625 | A2 | 8/2017 |
| WO | 2019008850 | A1 | 1/2019 |

OTHER PUBLICATIONS

"Patents Act 1977: Search Report under Section 17", GB Application No. GB2110270.2, Aug. 18, 2021, 4 pp.

"Patents Act 1977: Combined Search and Examination Report under Sections 17 and 18(3)", GB Application No. GB2018200.2, Jan. 11, 2021, 8 pp.

Bonnin, Xavier , et al., "A High Voltage High Frequency Resonant Inverter for Supplying DBD Devices with Short Discharge Current Pulses", IEEE Transactions on Power Electronics, vol. 29, No. 8, 2014, pp. 4261-4269.

Japanese Office Action (including English machine translation) corresponding to JP 2023-530689; Dated: Jul. 22, 2025, (18 pp).

Korean Office Action (including English machine translation) corresponding to KR 10-2023-7016011; Dated: Aug. 18, 2025, (30 pp).

* cited by examiner

DRIVE CIRCUIT FOR A DIELECTRIC BARRIER DISCHARGE DEVICE AND METHOD OF CONTROLLING THE DISCHARGE IN A DIELECTRIC BARRIER DISCHARGE

RELATED APPLICATIONS

This application is a 35 U.S.C. § 371 national phase application of International Application Serial No. PCT/EP2021/082310, filed Nov. 19, 2021, which claims the benefit of and priority to Great Britain Patent Application Serial No. 2110270.2, filed Jul. 16, 2021 and Great Britain Patent Application Serial No. 2018200.2, filed Nov. 19, 2020, which are each incorporated herein by reference in their entirety.

FIELD OF THE INVENTION

The present invention relates to resonance circuits, such as resonance circuits used in conjunction with dielectric barrier discharge devices.

BACKGROUND

Dielectric barrier discharge (DBD) devices, such as DBD type reactors, are able to be used to remove unwanted substances from fluids, such as gases or liquids, passing through the reactor. These substances include hydrocarbons, nitrogen oxides (NOx) and sulphur oxides (SOx).

One application for DBD devices is removal of substances from exhaust gases. In such an application, as well as in others, the gas passing through the device has a pressure of around atmospheric pressure. At around atmospheric pressure DBD devices typically exhibit an ignition/breakdown voltage of a few kilo-Volts (kV) to tens of kV.

Electrically, a DBD device imposes a capacitance of between around 10 nano-Farads (nF) to around 100 nF for an industrial-scale gas purification system. Such devices are able to receive or accept pulsed high voltages across the electrodes to initiate or trigger plasma ignition (also referred to as dielectric barrier electrical discharge) between the electrodes.

Excitation of the device with high voltage slew rates (high dV/dt) and short pulse-widths (around 100 nanoseconds, ns, to around 10 microseconds, μs) results in higher reactor efficiency. This allows an increased reduction of pollutants in gas passing through the reactor for a given amount of electrical power. However, because of the low power factor (PF) of such a DBD device, provided by the ratio of real power (P) to apparent power (S), achieving a high power transfer efficiently is challenging. By high power transfer efficiency, we intend to mean high efficiency, such as high conversion efficiency.

Available high-voltage pulsed-power equipment for industrial-scale systems typically employ a low-voltage pulse generation unit with about a 400 Volts (V) to about 1000 V peak output pulse voltage and a subsequent step-up transformer with a turns ratio of around 1:20 to around 1:40 to meet the required plasma ignition voltage levels.

Due to the low PF of a DBD device, a large amount of reactive power is needed to repeatedly cycle the voltage at the device. This results in a comparably low amount of real power actually being transferred to the plasma, which imposes a fundamental challenge to achieve a high efficiency.

To exemplify this difficulty, a DBD device with equivalent capacitance of 5 nF and a 20 kilo-Volt (kV) ignition voltage, in order to achieve a voltage rise-time of at least 1 μs for dielectric barrier electrical discharge, a charging/discharging current of 100 amps (A) is required. Consequently, for a 1:20 step-up transformer, 2 kA peak current must be handled by the power electronics of a pulse generation unit used for the DBD device.

A further issue is that even if ignition to provide dielectric barrier electrical discharge under such circumstances is achievable, the remaining energy stored in the capacitance of the DBD reactor after the plasma ignition is not recovered. Instead this energy is dissipated in the pulse generation unit or in the DBD reactor itself. The resulting losses of the power semiconductors employed in the pulse generation unit and the winding losses in the step-up transformer result in unsatisfactory power conversion efficiency and limit the maximum feasible pulse repetition rate when keeping the power electronics within a safe operating temperature. To address this there is a need to limit the pulse repetition frequency (PRF) to values of a few hundred of hertz (Hz). However, this ultimately limits the average electrical power transferred to the plasma, which is undesirable and ineffective.

As a contrast to devices that use repeated cycling, available resonant power converter equipment, which is also often employed to drive DBD devices with continuous high frequency alternating current, AC, (not pulsed) is known. Indeed, such systems are known for their good power conversion efficiency and high output voltage gain when operated close to the resonance frequency. However, as discussed in scientific literature and based on experimental evidence, continuous high frequency AC excitation of DBD reactors typically result in less effective pollutant reduction. This lack of effectiveness is due to less reactive species being generated by the breakdown caused by the excitation and flue gases being heated dissipating the power instead that power being usable to cause further generation of reactive species.

Accordingly, there is a need to address low overall efficiency in DBD devices and limited average power transfer capability while protecting circuits from damage from high peak currents.

SUMMARY OF INVENTION

According to a first aspect, there is provided a drive circuit for (i.e. suitable for) a dielectric barrier discharge device, the circuit comprising: a power supply connectable in use across a dielectric discharge gap, the dielectric discharge gap providing a capacitance; and an inductance between the power supply and the dielectric discharge gap when connected thereby establishing a resonant tank in use, wherein power is provided in use to the tank in pulse-trains and only during a pulse-train, a pulse frequency of each pulse-train being tuneable in use to a resonant frequency of the tank, power provided by each pulse-train charging and maintaining the tank to a threshold at which discharge ignition occurs (at the dielectric discharge gap), discharge ignition events per pulse-train (such as discharge ignition events occurring during the period of any one pulse-train) being limited to a maximum number based on the drive circuit being arranged in use to prohibit each pulse-train transferring power to the resonant tank after the maximum number has occurred.

By providing pulse-trains of power to the resonant tank, the amount of energy stored in the resonant tank increases, also referred to as "charging" the resonant tank, over the duration of each pulse-train. Dielectric barrier electrical discharge occurs across the dielectric discharge gap when the potential difference across the gap reaches a threshold ($V_{th}$). By tuning the pulse frequency (by which we intend to mean the reciprocal of the period between individual pulses or cycle period of pulses within a pulse-train) of the pulse-trains to a resonant frequency of the tank the charging process causes a rapid increase in the amplitude of the potential difference. This increases the potential difference amplitude to the threshold over, for example, less than ten cycles, to reach a threshold at which dielectric barrier electrical discharge occurs (which can also be referred to as an "ignition threshold").

A limitation on current imposed stress is provided by using the device of the first aspect. Limitation on current imposed stress is achieved using such a device by the build up to the potential difference to the threshold occurring over several cycles (i.e. individual pulses) during the pulse-train by means of the resonant tank voltage gain resulting in reduced power losses in the driving circuit. In conventional pulsed-plasma systems, plasma discharge is provided by use of a single pulse, requiring a high step-up transformer, resulting in a higher current, and thereby raising current imposed stress on the primary winding side.

Further, the power supply is protected from short-circuits without needing overcurrent detection. This is due to the inductance of the resonant tank providing enough impedance to limit currents if the output terminal of the power supply is shorted, for example, due to a short circuit failure at the dielectric barrier.

Additionally, by limiting the number of discharge ignition events, there is a reduction in dissipation of energy simply to heat or to generation of less reactive species. Indeed, we have found that by implementing such a hybrid of resonant AC and limited pulse excitation effective pollutant reduction is providable while also having high power conversion efficiency.

Accordingly, overall, in a device according to the first aspect, power transfer to the dielectric barrier discharge device with a high efficiency is achieved (due to the resonance operation) while also limiting current imposed stress and protecting against short-circuits so as to protect circuit components.

The dielectric discharge gap is intended to be a gap between electrodes of a dielectric discharge device. This typically provides a capacitance due to the gap, with a further capacitance being provided by the dielectric. Of course, when the drive circuit according to the first aspect is connected across the discharge gap, since the edges/sides of this gap are provided by the electrodes, it is intended the drive circuit is connected (i.e. electrically connected) to at least the electrodes in a manner that allows the drive circuit to provide current to the electrodes and establish a potential difference across the electrodes. In various examples, the drive circuit may still be connected across the dielectric discharge gap by being connected to wires or cabling connected to the electrodes that form a closed circuit that includes the drive circuit and dielectric discharge gap.

The cycle period of power being supplied by the resonant tank is intended to refer to the period taken for the current and/or voltage to pass through a single oscillation cycle (only) as determined by the frequency. In other words, this is intended to be the time taken for the current and/or voltage to pass through a single wavelength (only).

Additionally, by the term "discharge", we intend to mean electrical discharge of some form, such as plasma generating discharge. Typically this means release and transmission of electricity in an applied electric field through a medium such as a gas. A flow of electrons in the form of a filament passing from one location to another or between two points typically achieves this. The flow of electrons is typically a transient flow of electrons in the form of a filament. By this we intend to mean that the flow of electrons in a microdischarge/filament during electrical discharge lasts for only a short time per individual discharge ignition event. There may of course be many filaments over time if suitable conditions are maintained. The electrical discharge allows transmission of electricity in an applied electric field through gas.

The presence of the dielectric at the dielectric discharge gap typically does not allow arcs or sparks to occur (i.e. discharge that generates sustained current between the electrodes). Instead, it typically only allows microdischarges to occur, which typically only last for microseconds. This provides the necessary energy and components to contribute to a chemical reaction pathway to break down compounds in the medium through which the discharge is passing, while limiting the amount of power needed to provide sustained discharge.

By providing such discharge this is able to cause transfer of real power to the medium by generation of high energy electrons that interact with the fluid. This is due to a conversion of electrical energy to chemical energy as the real power transfers to the medium, enabling breakdown of the medium or components of the medium. This conversion can cause losses due to a number of factors, such as losses in the circuit, electrodes, dielectric and/or to heating the medium. Such losses are typically unwanted but can be unavoidable in the process. As such, losses may be minimised to have a maximal rate of production of high energy electrons.

Turning to a process by which discharge caused by a drive circuit according to the first aspect can be thought of as there initially being an absence of discharge occurring before an ignition threshold is reached. This means gas in the discharge gap (such as between electrodes) has not been ionized, and there is no electric discharge, and, of particular relevance, power is not delivered to the gas. Once the threshold is reached discharge occurs however. This results, from a single point (such as some form of sub-macroscopic structure on the surface of an electrode defining a side of the discharge gap), in innumerable transient filaments (each representing a micro-discharge) being formed. Each filament's lifetime (i.e. the period of time during which a respective filament exists) is of the order of tens of nanoseconds. It is only during the lifetime of these transient micro-discharges that high energy electrons are formed in the discharge gap, allowing power to be delivered to the medium in the gap. The power delivered by high energy electrons that are generated is able to initiate pollutant breakdown due to the energy levels being of a sufficient amount to initiate chemical reactions.

Maintaining a discharge gap at the voltage threshold indefinitely causes charge accumulation on the surface of the electrodes and dielectric barrier of a dielectric discharge gap of a DBD device. This can be avoided by the use of pulses.

Pulses can be thought of, due to the alternating polarity provided by pulses, as limiting the amount of time the instantaneous voltage at the discharge gap is maintained at the ignition threshold to a period in the order of a few microseconds. This means that transient filaments are only able to be produced for this period. As such, the period in which microdischarges can occur can be thought of as limited to the amount of time the instantaneous voltage at the discharge gap is maintained at the ignition threshold, and the summation of those transient filaments may be considered to be a "macro-discharge" or "discharge event".

In view of the preceding four paragraphs, the term "discharge ignition event" is therefore intended to be the start of a macro-discharge or discharge event; or, in other words, the start of the period during which micro-discharges in the form of transient filaments are able to occur, which is when a threshold is reached. This threshold is typically a voltage threshold, such as a voltage threshold at the dielectric discharge gap, for example in the form of a potential difference (e.g. $\Delta V$) across the electrodes/dielectric layer and electrode delimiting the gap.

The pulse frequency of the pulse-train being tuneable in use to a resonant frequency (also able to be referred to as a "resonance frequency") of the tank, is intended to mean that the pulse frequency may be tuned to one or more of a number of frequencies that is able to be considered the resonant frequency. These include the theoretical resonant frequency (i.e. the frequency that would be calculated as being the resonant frequency when not accounting for real-world effects), or a practically applicable resonant frequency, such as a frequency that takes account of real-world effects, which may include one or more of inductance and/or resistance in wiring and/or other components, damping or impedance. As such, as detailed further below, a zero voltage switching frequency.

The maximum number of discharge ignition events may typically be between one and five events, such as between one and three events, including (only) one event, two events or three events. By limiting to so few discharge events, we have found this produces the most energy efficient and effective breakdown of pollutants. This is due to the energy transfer that occurs due to the discharge ignition event(s) limiting transfer to the medium in the discharge gap, and thereby directing a higher proportion of the energy to cause breakdown of compounds in the medium.

The drive circuit may further comprise a phase meter in communication with the tank and arranged in use to identify (such as by monitoring) a phase shift in power provided to the tank during each pulse-train, the phase shift corresponding to occurrence of discharge ignition events, and wherein the drive circuit may be further arranged in use to determine when the maximum number of discharge ignition events has occurred based on the number of pulses in the respective pulse-train since each respective discharge ignition event.

We have found that such a phase shift represents the start of discharge, and, as such, it is possible to identify the number of discharge ignition events that occur from that point (such as by counting or being aware of the number of pulses in the pulse train from that point onwards). This means it is possible to determine when a maximum number of discharge ignition events has been reached to stop further discharge ignition events occurring. By monitoring a voltage-current phase-shift at, for example, an input to the resonant tank (such as a voltage-current phase-shift measured at the H-bridge terminal, relevance of which H-bridge being detailed further below) a first discharge ignition event may be detected. During charging of the resonant tank (e.g. the rapid voltage built-up) there is typically close to zero phase-shift (excited at resonance). However, once the plasma is ignited as part of the discharge ignition event, there is typically a shift in the resonance frequency because of the increase in capacitance imposed by the "ignited" discharge gap. When monitored, this resonance frequency shift may be detected immediately by monitoring the phase-shift.

Such a phase meter (e.g. a phase detection unit) as mentioned above may be provided by a controller, processor, microprocessor or microcontroller or another such device capable of monitoring phase of at least two signals.

Additionally or alternatively to phase monitoring or using a phase meter, each pulse-train may have a pre-tuned or optimised pulse-number (i.e. number of pulses within the pulse-train). It is typically possible to calculate or model how many pulses will be needed to charge the resonant tank, and typically there is (only) a single discharge ignition event per pulse, or at least it is possible to calculate how many discharge ignition events will be caused per pulse. This allows it to be possible to set the number of pulses in a pulse-train to at least the maximum number of discharge ignition events wanted plus the number pulses needed to charge the tank. If such an approach is used, there may of course be further pulses included in a respective pulse-train, such as when pulses are used to discharge the resonant tank. These may also be included in calculation of how many pulses are needed per pulse-train if this approach is used.

The circuit may further comprise a power storage device connected across the power supply arranged in use to accept and store power discharge (i.e. power drained) from the tank after each pulse-train (or after the maximum number of discharge ignition events has occurred). This provides a means for storing/recouping power within the circuit that would otherwise be lost due to energy in the resonant tank dissipating. This reduces energy loss between pulse-trains and allows the stored energy to contribute in forming the next high voltage pulse-train, which results in increased efficiency.

Energy or power recuperation is able to be achieved through passive or active means. Typically, an active means is used, such as the drive circuit typically being arranged in use to shift the phase of (pulses in) the pulse-train by 180 degrees (°) after the maximum number of discharge ignition events has occurred. By implementing this mechanism, energy recovery is able to be achieved when passive means for energy recovery (and potentially any other active means) are not possible, such as due to use of a loosely coupled air-core transformer. This thereby allows the efficiency gains achievable from energy recovery to still be achieved The phase shift may be in place for the same number of pulses as the number of pulses used in the pulse-train to charge the resonant tank to the threshold, although it would be possible to apply the phase shift for a different number of pulses. This maintains similar power flows when charging and discharging the resonant tank.

The circuit may further comprise an inverter between the power supply and the tank, the inverter being arranged in use to modulate supply of power to the tank from the power supply. This allows the characteristics and properties of the power provided to the resonant tank to be determined by components within the circuit instead of by any input to the circuit. This provides a great amount of customisation and alterations to be made than when this is determined by power provided at a circuit input.

The inverter may be any suitable type of inverter. Typically, the inverter is an H-bridge or half bridge. This provides a simple mechanism for providing the inverter functionality while also allowing direct and easy control over the output from the inverter to achieve passive and/or active recuperation of the energy stored in the tank at the end of every pulse-train.

When an H-bridge or half bridge is used, the switches used in the bridge inverter may be any suitable switch, such as a mechanical switch or power transistor switches. Typically each switch of the inverter may be a silicon or silicon carbide (Metal Oxide Semiconductor Field Effect Transistor, MOSFET) switch, a silicon insulated-gate bipolar transistor (IGBT) switch, or a gallium nitride power transistor (FET) switch. A silicon MOSFET switch typically has a blocking voltage of about 650 V; a silicon carbide (SiC) MOSFET switch typically has a blocking voltage of about 1.2 kV; a silicon IGBT switch typically has a blocking voltage of about 650 V or about 1.2 kV; and a gallium nitride FET switch typically has a blocking voltage of about 650 V. It is also possible to use a multi-level bridge-leg with several low-voltage devices connected in series to achieve a high(er) blocking voltage bridge-leg. However, typically a mechanism is needed to make sure that the voltage is shared equally across the switches, which makes things complicated and less rugged. This is why the 2-level H-bridge is typically used in the drive circuit according to the first aspect. The use of the above switches in the inverter also allows the components to be kept simple. Wide bandgap (WBG) semiconductors, such as SiC and GaN, are typically used due to their superior performance over Si based power semiconductors.

The pulse frequency (such as of the frequency of a voltage waveform if provided as a pulse-train) supplied to the resonant tank may be exactly the resonance frequency of the tank, such as the frequency of the first order harmonic (i.e. fundamental frequency or natural frequency), or at around the resonance frequency, such as within a range of the resonance frequency. If a higher order harmonic is used, due to the resonant tank typically having low pass characteristics, higher order harmonics than the first order harmonic are attenuated or damped. This is why the resulting current and voltage across the dielectric discharge gap is almost perfectly sinusoidal even though the excitation is typically provided in a square waveform.

When an inverter using switches, such as an H-bridge or half bridge inverter, is used, the pulse frequency of each pulse-train may be a zero voltage switching (ZVS) frequency. This is typically slightly above the exact resonance frequency of the tank, such as about 5% to about 10% above the exact resonance frequency, and no more than about 10% depending on the Quality (Q) factor of the circuit. This reduces losses caused by the switching and reduces electromagnetic interference (EMI) caused by the switching, thereby making the inverter more efficient and reducing noise produced by the inverter.

The circuit may further comprise a transformer, secondary windings of which form part of the resonant tank, the transformer being a step-up transformer. This lowers the minimum voltage gain needed in the resonant tank to achieve dielectric barrier electrical discharge voltage levels (i.e. $V_{th}$) by raising the voltage input level. Additionally, the use of a transformer reduces ground currents (currents flowing in the parasitic capacitance between electrodes of the DBD device and any surrounding metallic housing), thereby reducing EMI. While a transformer could be located within the circuit with the primary windings forming part of the resonant tank instead of the secondary windings, in the arrangement where the secondary windings form part of the resonant tank, the kilo-Volt-Ampere (kVA) rating of the transformer is able to be reduced. In such a case, a reactive power of the DBD device may be compensated.

When a transformer is used, the circuit may be arranged in use to short the primary transformer windings after each pulse-train. When energy is being recovered/recuperated from the tank, the shorting of the primary windings is typically applied after the energy has been recovered, such as after a respective pulse-train has elapsed. Shorting the primary windings reduces ringing that may occur due to the components that make up the resonant tank. When an inverter is used, the shorting of the transformer primary windings may be achieved in use by switching on a low side or high side of the inverter. This avoids the need to include further components in the circuit, thereby limiting component count.

The inductance of the resonant tank may be provided or contributed to by one or more components, and may be provided by inductance in wiring or cabling between components within the circuit. At least a part of the inductance (such as some or all of the inductance) may be provided by the transformer. This uses a typically undesirable property of a transformer allowing that property to be used as a contribution to the functioning of the circuit. Any inductance provided by the transformer may be leakage inductance (also referred to as stray inductance) of the transformer. In some circumstances this can allow the resonant tank to not need to also include an inductor as a specific component.

As set out in more detail below, the transformer may be an air-core transformer. When an air-core transformer is used, this may have up to 60% magnetic coupling between windings. The use of an air-core transformer, such as an air core-transformer with 60% magnetic coupling between windings, enhances the inductance able to be provided by the transformer, reducing the need for the resonant tank to have any further inductance. Additionally, the resonance inductance, and thereby the resonant frequency of the resonant tank, may be tuned by adjusting the distance between the primary windings (also referred to as the transmitting coil) and the secondary windings (also referred to as the receiving coil) when using an air-core transformer. This reduces the need for placement of additional capacitors, as is known to be carried out in existing systems, into the circuit, thereby reducing component count. This is achievable due to planar inductive power transfer that occurs when using air-core transformer. Other arrangements that allow an air-core transformer to be implemented are also possible.

Air-core transformer windings have low coupling compared to other transformers (i.e. non-air core or solid core transformers). This allows the secondary (i.e. high voltage) side of the transformer to oscillate freely when no voltage is impressed from the primary side (such as when all switches are off and body diodes not conducting). The means for active energy recovery detailed above (i.e. the 180° phase shift of some pulses) removes these oscillations and avoids power losses when an air-core transformer is used.

The transformer may have a step up ratio of primary transformer windings to secondary transformer winding of about 1:1 to about 1:10, such as about 1:5. By applying this arrangement, the following equation holds, which it typically does not for known systems:

$$\frac{V_{dc}}{n} < \frac{V_{th}}{2}$$

where $V_{dc}$ is the voltage provided by a DC link power source, n is the turns ratio of the transformer (i.e. $N_1/N_2$, corresponding to the number of primary windings divided by the number of secondary windings), and $V_{th}$ is the ignition voltage or discharge threshold of the DBD device. As set out in the next paragraph, this reduces the gain needs For a dielectric barrier electrical discharge ignition voltage threshold in a DBD device of about 20 kV, this means that a minimum resonant tank voltage gain of about a factor 5 is needed for a step up ratio of about 1:5 when the input voltage to the drive circuit is about 800 V. This achieves an optimised balance between transformer step-up and resonant tank voltage gain, significantly reducing the currents stress of the drive circuit, compared to a conventional pulsed-power and resonant converter system relying primarily on a high step-up transformer (1:20 or greater) to attain the required discharge voltage levels.

Until the discharge threshold is reached, there is minimal damping in the resonant tank. This is because there is no load (such as power transfer to the medium in the discharge gap) on the resonant tank during charging. As a comparison to known resonant systems, in such systems, there is typically always a load because there is continuous or prolonged discharge, which generates a load.

The lack of load on the resonant tank of a drive circuit according to the first aspect results in very high voltage gains (such as gains with Q values of greater than 50) compared to known systems. Unlike known systems, the achievable voltage gain of the resonant tank, does not depend on the load (as noted, typically corresponding to the power transferred to the gas when dielectric discharge occurs). Instead, it (only) depends on the parasitic resistances of the resonant tank (such as those produced by resistance of the magnetics and electrodes).

Further, due to there being a lack of load, this allows more rapid charging and for the pulse frequency of the pulse-trains to be as close as possible to the true resonance frequency of the tank (such as the theoretical resonance frequency that does not account for damping effects typically present in reality). This is because the amount of damping is so low that minimal account needs to be taken of damping when the pulse frequency is set. This enhances the energy transfer ability, making the drive circuit more efficient.

When there is a transformer, the dimensioning needed of the transformer step-up turns ratio (i.e. the specification set for the transformer step-up turns ratio) also only depends on the parasitic resistances of the resonant tank. Should there be a load to account for as well, dimensioning of the transformer step-up turns ratio would also need to account for this. This allows losses from the transformer to be kept to a minimum thereby reducing the effect of using a transformer on the efficiency of the drive circuit compared to when a load does need to be considered.

Alternatively or additionally to a transformer providing inductance, at least a part of the inductance (such as some or all of the inductance) may be provided by an inductor. This provides a component designed to provide inductance to be used, thereby optimising the circuit. In a situation where the inductance is provided partially or wholly by an inductor and a transformer, each contribute to inductance between the power source and the dielectric discharge gap, and thereby to inductance of the resonant tank.

When a separate transformer and inductor are provided, there are several possible arrangements of the circuit. One arrangement is for the inductor to be connected to the input to the resonant tank (such as the output of the inverter), this is in turn connected to the primary winding of the transformer; the secondary windings of the transformer are then connected across the dielectric discharge gap. A further arrangement is for the input to the resonant tank to be connected to the primary winding of the transformer; the secondary winding is connected to the inductor, which is connected in series with the dielectric discharge gap. In each of these arrangements, the leakage or stray inductance of the transformer contributes to a resonance inductance value (i.e. the inductance) of the resonant tank. Naturally, if the resonant tank is placed after the transformer, the kVA rating of the transformer is reduced because the oscillating reactive power of the dielectric discharge device is not passing through the transformer.

Another arrangement is for the input to the resonant tank to be connected to the primary winding of the transformer; and the secondary windings of the transformer are connected across the dielectric discharge gap. In this arrangement, since no separate inductor component is provided, the leakage or stray inductance of the transformer would need to be large enough to compensate the load across the dielectric discharge gap at a desired resonance frequency. This can be achieved by means of a transformer with very low coupling between windings as it is the case for an air core transformer (i.e. without magnetic core) as referred to in more detail below.

According to a second aspect, there is provided a system for providing dielectric barrier discharge, the system comprising: a dielectric barrier discharge device having at least two electrodes with a gap for fluid therebetween defining a dielectric discharge gap, a dielectric layer being located between the at least two electrodes; and a drive circuit according to the first aspect, the power supply of the drive circuit being connected across the dielectric discharge gap.

The dielectric layer may be located between the electrodes, such as in the discharge gap, but not touching an electrode. Typically, at least one electrode may have a/the dielectric layer (or, when there is only a single dielectric layer, the dielectric layer) mounted thereto.

A sub-macroscopic structure may be mounted on at least one electrode. Application of a sub-macroscopic structure to the electrodes or dielectric portion (when the dielectric portion/layer is mounted on an electrode) is a technically difficult process due to the need to maintain order within the structure and the difficulty in attaching the structure to the surface of the electrode or dielectric portion. Additionally, using a sub-macroscopic structure implements a "plate to point" structure causing a disparity in the homogeneity of the electric field strength since the field strength at an end of the structure is higher than on (for example) an electrode that typically has a larger area over which the field is spread. However, we have found that using a sub-macroscopic structure in a dielectric barrier electrical discharge apparatus allows less power to be used. This is because, in use, when an electric field is established between an anode and a cathode, the structure field emits electrons. The field emission causes the gap between anode and cathode to have a raised density of electrons. This saves power as more electrons are present to initiate chemical reactions. This is achieved by combining the classical electrostatic phenomenon of dielectric barrier electrical discharge with the quantum phenomenon of tunnelling in the form of field emission when typically, classical and quantum processes are kept separate from each other when used in physical applications.

By the structure being connected to at least one of the electrodes or dielectric portion/layer, we intend to mean that at least one structure is connected to at least one electrode or dielectric. This means that more than one electrode and/or the dielectric portion may have one or more structures connected thereto.

There may of course be a plurality of structures, each structure being connected to one of an electrode or the dielectric portion, such as all the structures being connected to only single electrode or only the dielectric portion, or one or more electrodes and/or the dielectric portion having one or more structures connected thereto. It is intended that when a structure is connected to an electrode or the dielectric portion, that structure is only connected to that respective electrode or the dielectric portion, and not also connected to an or another electrode or the dielectric portion (when connected to an electrode).

The sub-macroscopic structure may be a nanostructure. The nanostructure could be a carbon, silicon, titanium oxide or manganese oxide nanowire, nanotube or nanohorn, or stainless steel, aluminium or titanium microneedles. The nanostructure may typically be a carbon nanotube (CNT). CNTs have been found to be very good field-emitters of electrons when exposed to an electric field. CNTs and other materials can produce large numbers of electrons at relatively low applied voltages because of their very high aspect ratio (typically to 200 nanometres, nm, diameter versus 1 to 2 millimetres, mm, in length, i.e. to 40,000 aspect ratio) and their low work function (typically around 4 electron volts, eV). The high aspect ratio causes a large field enhancement at the tips of the CNTs with several volts per micrometre, also referred to as a micron, (V/μm) achievable at low applied voltages. The minimum electric field strength required for field-emission from a CNT is generally around 30 V/μm. This can be achieved by varying one or more of the length of the CNT, the diameter of the CNT, the distance between the electrodes used to create the electric field, and the applied voltage used to establish the electric field. If an array of CNTs is used, the density of the array can also be varied to vary the electric field strength since CNTs tend to shield one another.

The nanostructure could be a multi-walled CNT (MWNT) or a metallic single walled CNT (metallic SWNT).

The structure may be electrically connected to at least one of the electrodes. Additionally or alternatively, the or each electrode to which the or each structure is electrically connected may be arranged in use to provide a cathode.

The nanostructure may have an aspect ratio of length to width of at least 1,000 (i.e. 1,000 to 1). A nanostructure with an aspect ratio of at least 1,000 provides more efficient field emission than those with a lower aspect ratio. The aspect ratio may be at least 5,000 or at least 10,000. Increasing the aspect ratio has been found to further increase the efficiency of the field emission.

The electrodes may be any suitable material for providing electrodes that allow an electrical field to be established therebetween. Typically, the electrodes may be made of an electrically conductive metal.

The dielectric portion may be connected to a first electrode (such as an anode) and the structure may be connected to a second electrode (such as a cathode).

This allows application of the dielectric portion and structure to the respective electrodes to be independent, which avoids the possibility of the processes for applying the dielectric portion to the electrode and for applying the structure to the electrode damaging the structure or dielectric respectively. Accordingly, this simplifies the process of manufacturing the apparatus and reduces the failure rate in manufacture.

The use of the dielectric portion and the structure provide a synergistic effect of lowering the power and voltage needed to establish dielectric barrier electrical discharge. Additionally, using the dielectric portion allows the dielectric barrier electrical discharge to be more controllable by reducing the amount of sparking and thereby the amount of wear and damage caused by dielectric barrier electrical discharge. If the structure was used without the dielectric portion, the larger amount of sparking would limit the usefulness of the structure since this is typically more susceptible to damage form sparking than other parts of the apparatus. Conversely, if the dielectric were used without the structure, the density of electrons to initiate breakdown in fluid passing between the electrodes would be lower and thus require higher energies to achieve the same reduction efficiency. As such, the combined effect of using the dielectric and the structure has a greater benefit than the benefits offered of using each independently.

The dielectric portion may be one or more of mica, quartz, alumina (i.e. $Al_2O_3$), titania, barium titanate, fused silica, titania silicate, silicon nitride, hafnium oxide or a ceramic. By the phrase "one or more of" in this case we intend to mean a combination of two or more of the named materials when two or more of these are used.

Typically, the dielectric portion is quartz. This is because quartz as this material is readily available, low cost, can be processed in large quantities and can have a high resistance to thermal stress. The dielectric portion may alternatively be mica. Mica is beneficial because it has a slightly higher dielectric constant than other dielectric materials, such as glass.

The system may further comprise a controller connected to the drive circuit, the controller being arranged in use to adjust the power supplied to the tank of the drive circuit based on input provided to the controller. This allows modification of the power provided in use to the resonant tank providing the ability to make alterations when parameters within the system change during use, causing a shift in properties within the system. For example, a change in fluid passing between the electrodes may cause a change in the capacitance of resonant tank, altering the resonant frequency. The controller could then be used to adjust the pulse frequency provided to the resonant tank during a pulse-train.

The controller may be arranged in use to adjust the pulse frequency (such as the frequency of a voltage waveform or current waveform), and/or the pulse-train frequency, and/or the number of pulses in a pulse-train, and/or number of pulse-trains and/or pulse train repetition frequency. This provides a wide range of adjustments that can be made to allow the power provided to be tailored to provide optimum dielectric barrier electrical discharge occurrence during use of the system.

Input provided to the controller may include one or more relevant parameters. Typically, the input includes voltage and current at an output of the drive circuit, such as at an output of an inverter. This allows phase angle between the supplied voltage and current and a pulse-train averaged phase to be calculated.

This can be used to optimise the pulse frequency provided during a pulse-train. As such, the controller may be arranged in use to determine (by which we intend to mean "calculate") phase difference between the voltage and current. This could of course be determined by a further component.

As noted above, this phase difference can also be used to detect the beginning of the occurrence of dielectric barrier discharges. Detecting this can allow it to be identified when transition the pulse-train from providing energy to, for example, energy recovery after a defined number of discharge ignition events. As also mentioned above, the occurrence of dielectric barrier discharge in the discharge gap increases the effective capacitance. This results in a reduction of the resonance frequency, and hence an increase of the measurable phase difference for a given driving frequency (such as the pulse frequency of the pulse-trains). In view of this, it can be seen that the phase meter of the drive circuit and the controller may be the same component as each other. Alternatively the controller and phase meter may be in communication with each other, or the controller may incorporate the phase meter, such as the phase meter being a component of the controller.

The drive circuit may comprise an inverter between a power supply and a resonant tank of the drive circuit. In this case the voltage and current may be being provided from an output of the inverter. This allows a more granular (i.e. more precise) level of control of the output provided to the resonant tank than would be achievable if an AC power supply was simply connected to the resonant tank to supply power due to the higher frequencies achievable using an inverter. Additionally, higher AC frequency, such is achievable using an inverter is able to provide shorter dielectric barrier electrical discharge. This allows simpler limiting of the maximum number of discharge ignition events and faster control than could be exerted if a standard AC power supply were used to maintain the efficiency gains achieved by limiting the number of discharge ignition events.

The controller may be further connected to the dielectric barrier discharge device, the input including one or more properties of fluid passing through the device in use. This allows the properties of the fluid to be taken into account when seeking to optimise performance of the system.

The system may comprise a plurality of dielectric barrier discharge devices and a plurality of drive circuits, each drive circuit being connected across the dielectric discharge gap of one or more dielectric barrier discharge devices, and optionally there is only a single power supply arranged in use to provide the power supply for all the drive circuits. This allows the system to be scaled to accommodate various volumes of fluid passing through it, such as various sizes of engine passing exhaust gas to be cleaned.

According to a third aspect, there is provided a method of controlling dielectric barrier electrical discharge in a dielectric discharge device, the method comprising: providing power to a resonant tank with a series of electrical pulse-trains, the pulse frequency of each pulse-train being tuned to a resonance frequency of the tank, the resonant tank being connected across a gap between electrodes in a dielectric discharge device, a capacitance of the tank being provided by the dielectric discharge device, power provided by each pulse-train charging and maintaining the tank to a threshold at which discharge ignition occurs; providing a maximum number of discharge ignition events per pulse-train by prohibiting each pulse-train transferring power to the resonant tank after the maximum number of discharge ignition events has occurred; and prohibiting power transfer to the tank between pulse-trains By the term "prohibiting" we intend to mean either passively or actively prohibiting power transfer to the tank, such as by not providing a path by which power can pass to the tank or by diverting a path to an alternate circuit respectively.

As noted above, the maximum number of discharge ignition events may be between 1 (one) and 5 (five) events.

The method may further comprise identify a phase shift in power provided to the tank during each pulse-train, the phase shift corresponding to occurrence of discharge ignition events; and determining when the maximum number of discharge ignition events has occurred based on the number of pulses in the pulse-train since each respective discharge ignition event. This provides an accurate means to avoid the maximum number of events being exceeded.

Each electrical pulse-train may be a voltage pulse-train. By this we intend to mean that the electrical pulse-train may be provided by a voltage pulse-train, such as a voltage waveform that may be used as an excitation waveform for the resonant tank, and which may induce a current waveform in the resonant tank.

The method may further comprising modulating the pulse frequency, and/or frequency of pulse-trains, and/or number of pulse-trains in the series of electrical pulse-trains, and/or number of pulses in each pulse-train. It is worth noting that the power frequency is able to be modulated by modulating the power or the constituents of the power, such as the voltage and/or current. The frequency of the power is twice the frequency of the voltage waveform (which the frequency the pulse frequency is intended to represent) that contributes to the power, which is the case for power systems in general. If the voltage and current are each sinusoidal waveforms, the power will be the square of a sinusoidal waveform (i.e. Sin^2), and the spectral decomposition will show the fundamental frequency at twice the excitation (i.e. voltage) frequency.

The modulation may be based on a phase difference in properties of the power provided to the resonant tank and/or one or more properties of fluid passing through the device.

Power may be provided to the resonant tank via a transformer, the method further comprising shorting the transformer primary winding between repeating pulse-trains. This prevents (i.e. mitigates) unwanted oscillations between the magnetising inductance of the transformer and the capacitance of the DBD reactor.

The pulse frequency of each pulse-train provided to the resonant tank may be set by switching in a circuit between a power supply and the resonant tank.

For each pulse-train, the resonant tank may be discharged (i.e. drained) after the maximum number of discharge ignition events has occurred. This may be achieved by active recuperation or passive recuperation. Under such circumstances, the method may further comprise storing energy passed out of the resonant tank by the discharge. Recovering energy in this manner significantly increases the energy efficiency of the method.

There is typically a temporal difference between the end time of one pulse-train and the start of the next pulse-train. In other word, there may typically be a period of time between the end of one pulse-train and the start of the next pulse-train during which there are no pulses, which allows one pulse-train to be distinguished from the next pulse-train and avoids any concurrent portions or overlap between consecutive pulse-trains.

BRIEF DESCRIPTION OF FIGURES

Example circuits and methods of operating an example circuit are described in detail below with reference to the accompanying figures, in which.

DETAILED DESCRIPTION

When using DBD devices, a pulsed system is able to be used to ignite dielectric barrier electrical discharge between electrodes in the device. As mentioned above, available high-voltage pulsed-power equipment for industrial-scale DBD systems typically employ a low-voltage pulse generation unit with a 400 V to 1000 V peak output pulse voltage and a subsequent step-up transformer with 1:20 to 1:40 turns ratio to meet the required dielectric barrier electrical discharge voltage levels.

Figure 1:
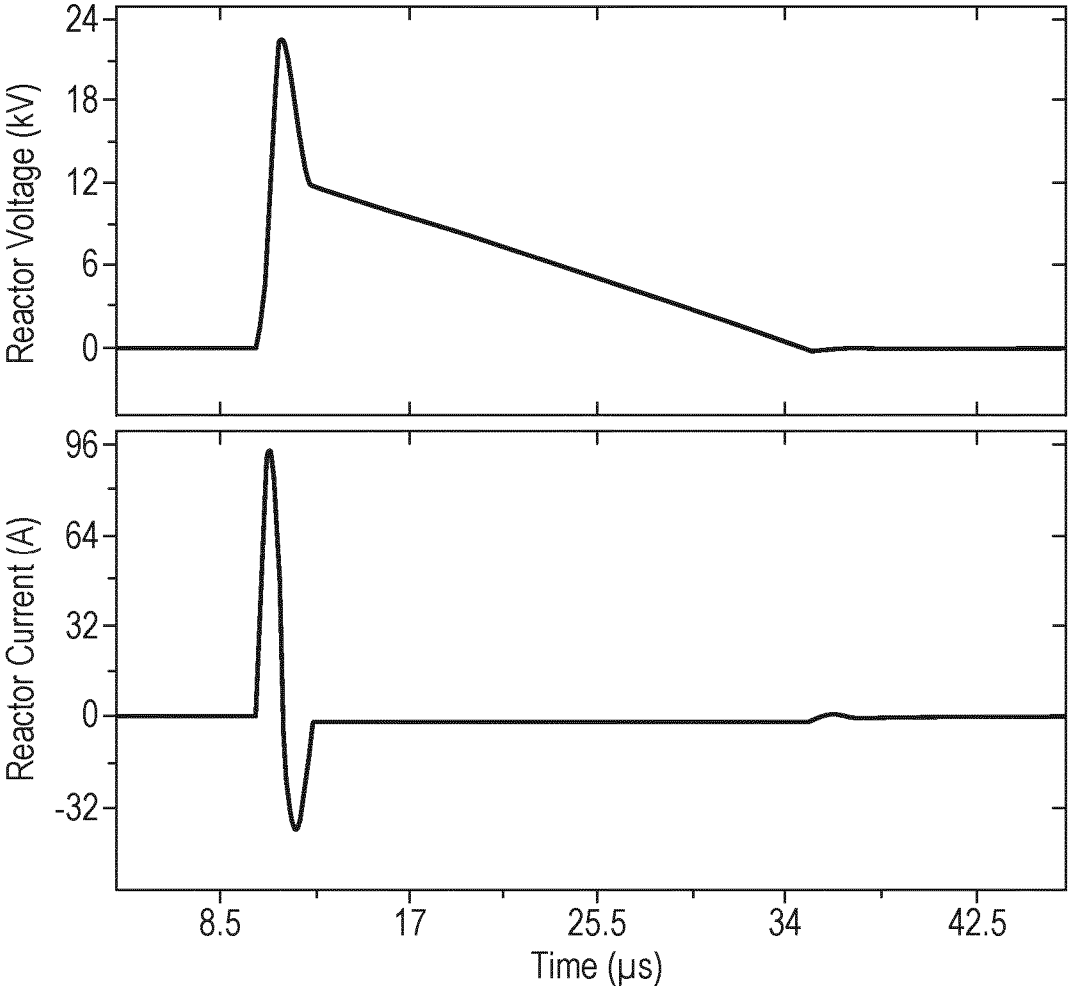
Fig. 1 PRIOR ART
FIG. 1 shows example plots of voltage and current in a pulse-train according to prior art device.

Characteristic voltage and current waveforms of a single pulse with a conventional high voltage pulse generator are shown in FIG. 1. This shows two plots, one of voltage against time and the other of current against time, for a prior art single pulse generated using a high voltage pulse modulator system used to charge a large DBD device.

The voltage plot can be seen to start at 0 V, then for the pulse to elevate to a peak of around 22 kV over around 1 microsecond (μs). The voltage then drops from the peak to a level of about 12 kV over the course of around a further 1.5 μs. The decrease in the voltage then slows to a linear decrease to 0V over around 21 μs.

The drop from the peak is caused by a natural resonance between the DBD device and transformer parasitics. The resonance causes an oscillation to start, which is what can be seen to be occurring in the drop from the peak. The resonance is then stopped by the pulse stopping, cutting the voltage being provided. As such, from that point, there is a linear discharge that occurs. If the pulse was not stopped, a cyclical waveform would be visible instead.

The corresponding current plot shows an increase in current from 0 A to a peak of around 90 A over around 0.5 μs. This then drops to around −40 A (negative 40 A) over around 1 μs and back to 0 A over about a further 1 μs.

The change in current occurs over the same time period it takes for the voltage to pass through its peak and back to 12 kV. The dielectric barrier electrical discharge initiates at about the point when the voltage reaches its peak and ends when the voltage returns to 12 kV from the peak. The linear slope back to 0 V from this point is due to energy dissipation in the pulse generation unit from the energy stored in the capacitance of the DBD device after the dielectric barrier electrical discharge occurs.

As set out above, due to the low power factor PF determined from the ratio of real power to apparent power in a DBD device, i.e. the large amount of reactive power needed to repeatedly cycle the voltage at the reactor and the comparably low amount of real power actually being transferred to the plasma imposes a fundamental challenge to achieve a high power transfer efficiency.

$$i = c\frac{\Delta v}{\Delta t} \qquad \text{Eq. 1}$$

As an example, a DBD device with equivalent capacitance of 5 nF and a 20 kV ignition voltage, in accordance with Eq. 1, in order to achieve a voltage rise-time of at least 1 μs, a charging/discharging current of 100 A is required. If a 1:20 step-up transformer is used, a 2 kA peak input current is required and must be handled by the various electronic components and pulse-generation unit prior to passing through the transformer.

In order to overcome the negative aspects of this, we have developed the examples devices, systems and methods set out in detail below. Such devices are able to be used in scrubbing exhaust gas, such as the apparatus disclosed in GB 2010415.4, which is incorporated herein by reference. This apparatus makes use of functionalised electrodes with sub-macroscopic features, carbon nanotube (CNTs), and a dielectric portion. The sub-macroscopic features are exposed to an electric field, resulting in the field-emission of electrons from the CNTs and dielectric barrier electrical discharge between the dielectric and opposing electrode. Gas to be scrubbed is then exposed to those electrons.

By the phrase "functionalised electrodes", we intend to mean electrodes that have a structure or structures, such as a coating, on it that has/have a functional aspect in addition to acting as an electrode (i.e. as an anode and/or cathode).

DBD Device

Figure 2:
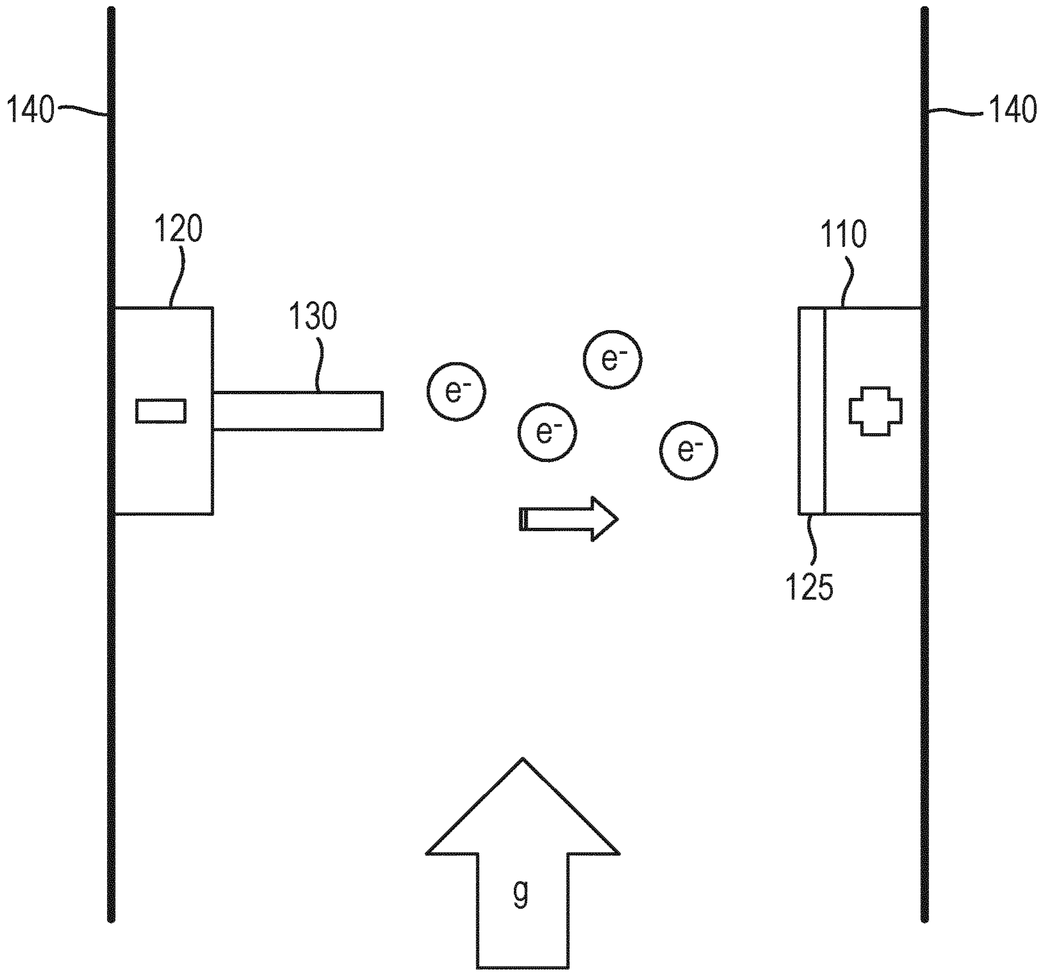
FIG. 2 shows a schematic illustrating the principle of an electron irradiation and dielectric barrier electrical discharge scrubbing technology in an example dielectric barrier discharge device.

FIG. 2 schematically illustrates the principle of this electron irradiation and dielectric barrier electrical discharge scrubbing technology. Two electrodes, an anode 110 and a cathode 120, are located so that they facing each other. In this example, a dielectric portion 125 is located on the anode. This dielectric portion provides a coating on the entire surface of the anode.

The example in FIG. 2 also includes a CNT 130 located between the anode 110 and the cathode 120. In this example, the CNT is electrically connected to the cathode. In other examples, other sub-macroscopic features, such as a micro-needle or micro-needle array, are able to be used instead of, or in addition to, one or more CNTs. These are able to function and operate in the same or similar manner to how the CNT is described as functioning below.

In use, the CNT 130 or other sub-macroscopic feature field-emits electrons (e−, $e^-$) in response to the presence of an electric field between the anode 110 and cathode 120 when a potential difference is established between them. The electric field between the anode and cathode also causes dielectric barrier electrical discharge (in the form of dielectric barrier electrical discharge) between the dielectric portion 125 and cathode 120.

The electrodes are coupled to a housing in order to locate the dielectric portion 125 and CNT 130 in the vicinity of a container 140 containing gas (g) to be scrubbed such that an interior of the container can be exposed to the field-emitted electrons and dielectric barrier electrical discharge.

For a compact arrangement, the anode 110 and/or cathode 120 can be attached to the interior of the container (such as a chimney) such that each of the dielectric portion 125, CNT 130 and a surface of the cathode extends into the chimney and the dielectric barrier electrical discharge and electrons traverse a cross-section of it. Many other arrangements could be envisaged however. For example, the dielectric portion and/or CNT and surface of the cathode could be located outside of, but close to, the container with a window (aperture) in the container side permitting electron access and a surface at which the dielectric barrier electrical discharge is able to initiate/terminate. Such an arrangement may for example be chosen to make retrofitting of the apparatus to an existing chimney easier, or for ease of maintenance of the dielectric portion and/or CNT part of the apparatus. The cathode and housing need not be co-located.

It may be more practical, such as in an industrial setting, to use arrays of CNTs rather than individual CNTs. It may also be beneficial to provide multiple sets of anode-dielectric-cathode-CNT apparatuses. Such a larger scale arrangement may be in a chimney, and could also be envisaged with multiple sets of anode-dielectric-cathode-single CNTs, or in which there is a single set of anode-dielectric-cathode-CNT array.

Wavelet Pulse-Train

When using a DBD device, such as one implementing the apparatus shown in FIG. 2, we have developed a process that implements a high frequency sinusoidal waveform with varying amplitude, resembling a wavelet-type waveform. In various examples, the wavelet is generated by connecting an inductor in series with a DBD device, which provides a capacitance. This forms a series resonance circuit, also referred to as a series resonant tank, which is capable of being excited at a resonance frequency. When excited at a resonance frequency repeatedly for several cycles using bipolar voltage pulses, this allows the DBD device to be excited with a high voltage slew rate while substantially reducing current stress, and which lowers the peak power processed by the power electronics. As such, voltage gain achieved in the resonant tank provides the high ignition voltage levels for the DBD device, instead of using a pulse-transformer with a high turns ratio to provide the voltage gain. Relevant attributes of the resonant tank are therefore the achievable voltage gain and the ability to compensate for the reactive power of the DBD device.

Applying several consecutive bipolar voltage pulses to form a pulse-train allows low power loss (demonstrated by the high efficiency noted below) and a higher pulse repetition frequency to be applied, and therefore the capability of average power transfer is substantially increased over a system using a single pulse. As an example, by applying this process, the pulse repetition frequency is able to be increased by at least ten times over such a system. This is achievable in combination with the use of silicon carbide semiconductor technology as described in more detail below.

Repetition frequency of pulse-trains is limited by a maximum operating temperature of power electronics. In general, pulse-power converter designs take advantage of the slow thermal response. This means that if a high pulse repetition frequency were used in a conventional pulsed system, dissipated peak power would be too large to stay within safer operating temperatures of the power electronics. This is avoided in the examples described herein by using the pulse-train modulation described below. Additionally, this is avoided by limiting the maximum number of discharge ignition events produced from a single pulse-train and then having a period that allows cooling to occur before the next pulse-train.

By implementing a pulse-train of several consecutive bipolar voltage pulses as described in relation to the examples set out herein, even if the number of discharge ignition events is limited to between one and five, this is achieved while providing energy transfer at very high efficiency, such as at about 90% efficiency or greater.

Figure 3:
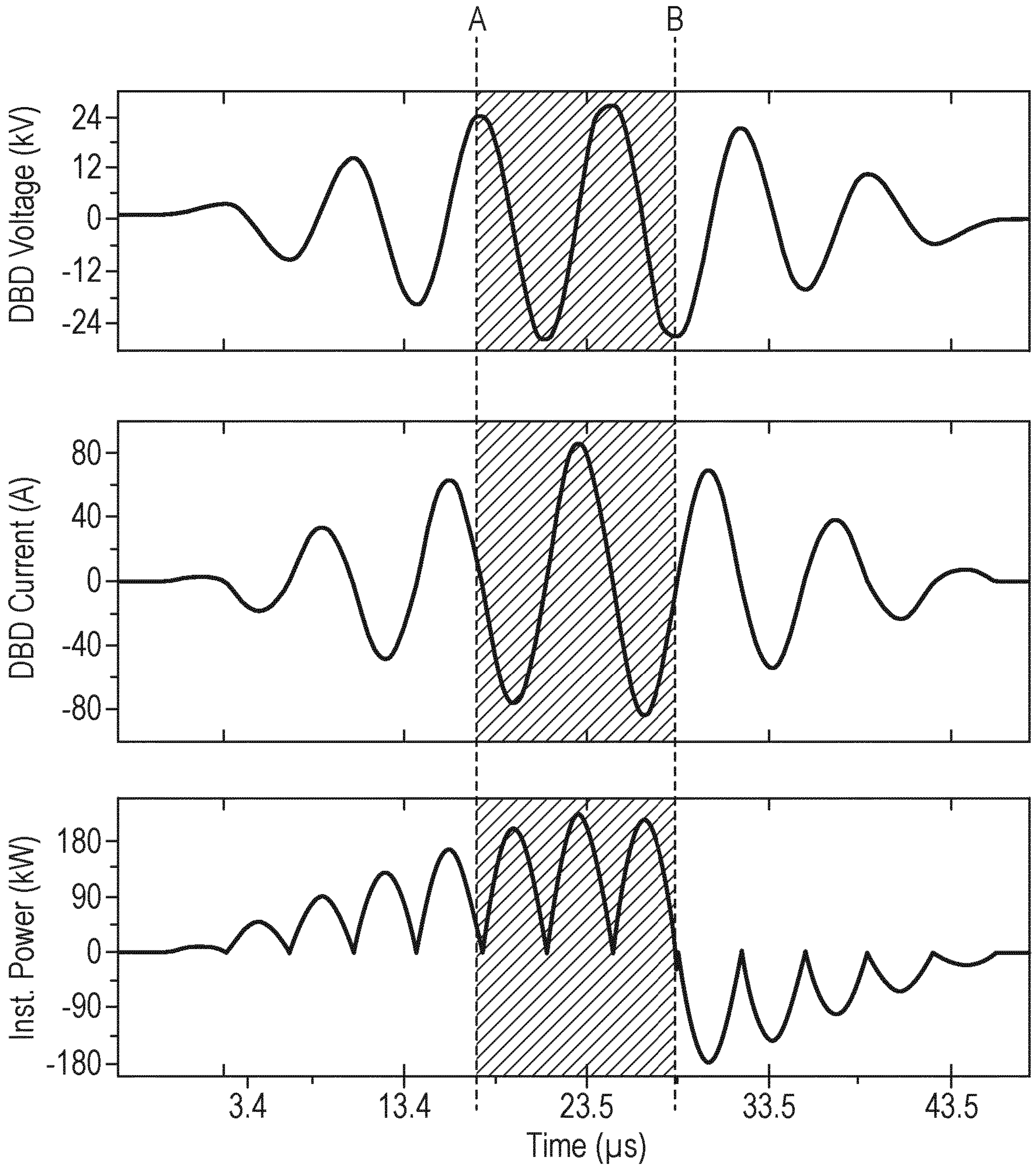
FIG. 3 shows example plots of voltage, current and power applied in an example circuit.

As shown in FIG. 3, the use of consecutive bipolar voltage pulses creates three modes of operation induced at the DBD device. The first mode, which occurs between 0 μs and time A in FIG. 3, is the charging of the resonance circuit. This builds up the potential difference across the electrodes in the DBD device. As set out above, this is achieved by applying consecutive bipolar voltage pulses at the resonant frequency of the resonant tank.

In the plots shown in FIG. 3 this can be seen to be a sinusoidal wave at consistent frequency that steadily increases in amplitude for both voltage and current. This results in an instantaneous power level of a rectified sine wave (as the multiplication of rectangular voltage and sinusoidal inductor current) with a steadily increasing amplitude. The duration of the mode in the example shown in FIG. 3 is around 2.5 voltage cycles, 2.5 current cycles and 5 power cycles (one power cycle being the transition from zero to a peak and back to zero). In this example, the current waveform leads the voltage waveform by about 90°.

The second mode takes place between time A and time B in the example plots of FIG. 3. This mode is reached when the voltage reaches the ignition or breakdown voltage ($V_{th}$) causing dielectric barrier electrical discharge between the electrodes of the DBD. This delivers power to the plasma and should last only a few discharge cycles for most efficient pollutant reduction. During this mode the voltage amplitude remains above the $V_{th}$ level due to continued excitation of the resonant tank at the resonant frequency. In the plots it can be seen that the voltage and current continue in a sinusoidal wave with consistent frequency. The amplitude of the waves varies slightly over the duration of this period (increasing to approximately the half way point of the mode's duration and then begins to decrease).

The example shown in FIG. 3 is based on the DBD device having a capacitance of approximately 3.0 nF. The voltage has a peak at about ±24 kV (positive-negative 24 kV) and a current of ±80 A. In other examples the capacitance of approximately 1.0 nF, but could also be approximately 45.0 nF or higher.

The voltage and current amplitude pattern is the same for the instantaneous power, which continues to be the rectified sine wave. The peak instantaneous power is about 180 kilo-Watts (kW) in the example shown in FIG. 3.

The duration of the second mode is about 1.5 voltage cycles, about 1.5 current cycles and about 3 power cycles.

During the first and second mode the resonant tank is excited by having power provided to it. During the third mode the excitation is stopped and the resonant tank discharges by draining. In some examples the tank is actively discharged by recovering the energy from the tank. A passive discharge is also possible.

Due to the excitation being stopped and a discharge path being provided, in the third mode the voltage, current and power reduce to zero. In the example plots in FIG. 3, the third mode is shown from time B onwards. The voltage and current follow a sinusoidal waveform with a consistent frequency as in the first and second modes. The power continues to be a rectified sine wave. The amplitude of the voltage and current decrease towards zero over the period of about 2.5 cycles for the voltage and about 2.5 cycles for the current.

The power plot shown in FIG. 3 is consistent with an example in which the resonant tank is passively discharged.

This can be seen by the instantaneous power being inverted so as to be the rectified sine wave, but with the peaks being negative values instead of positive as in the first and second mode. The amplitude of the power decreases to zero over about five cycles.

Figure 5:
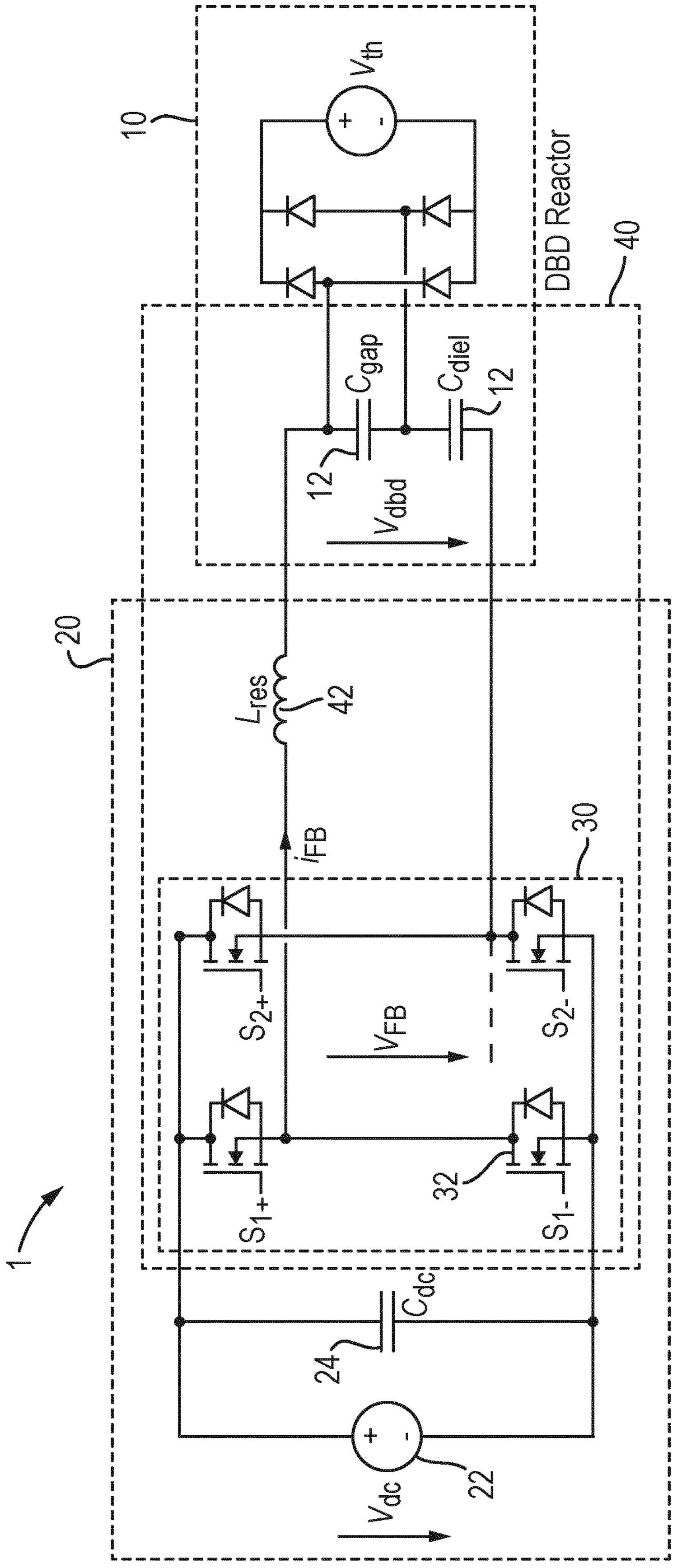
FIG. 5 shows an example circuit.
Figure 6:
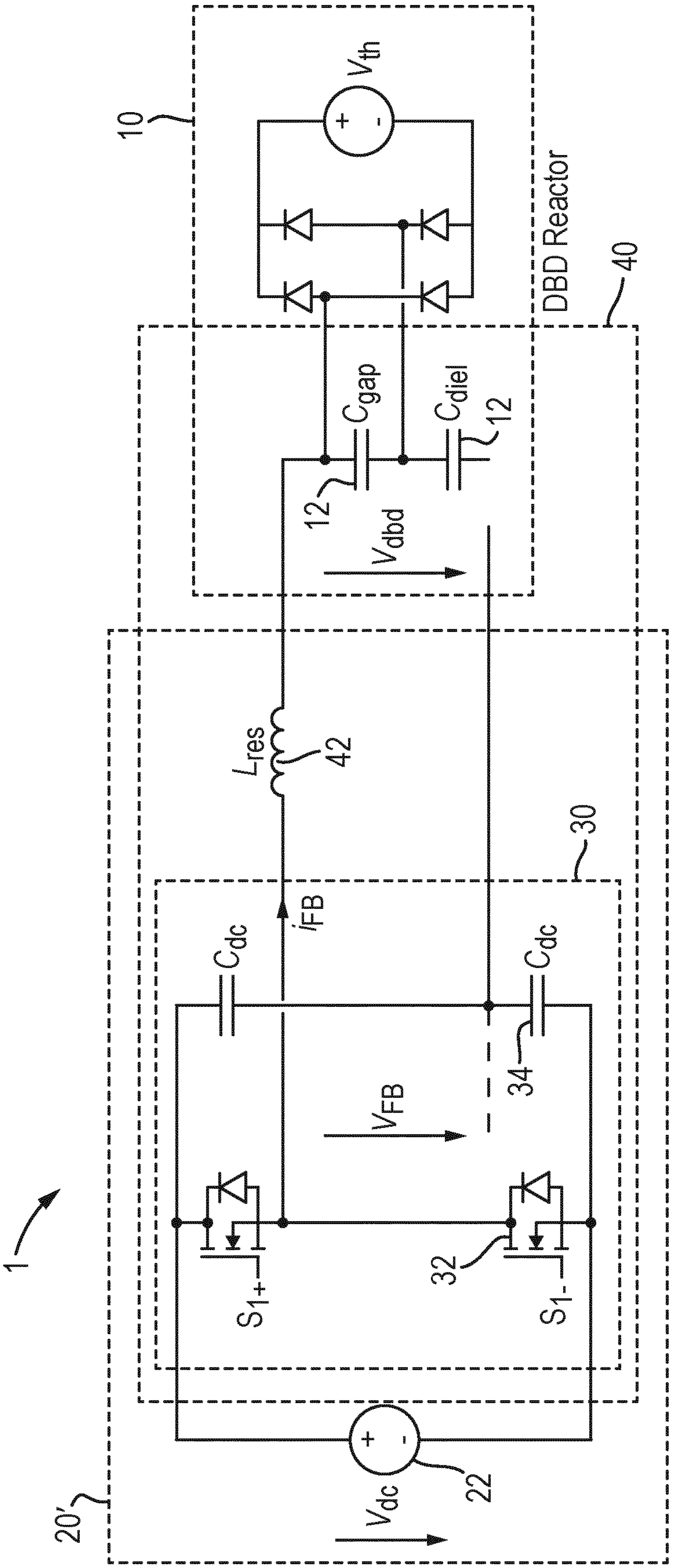
FIG. 6 shows a further example circuit.
Figure 7:
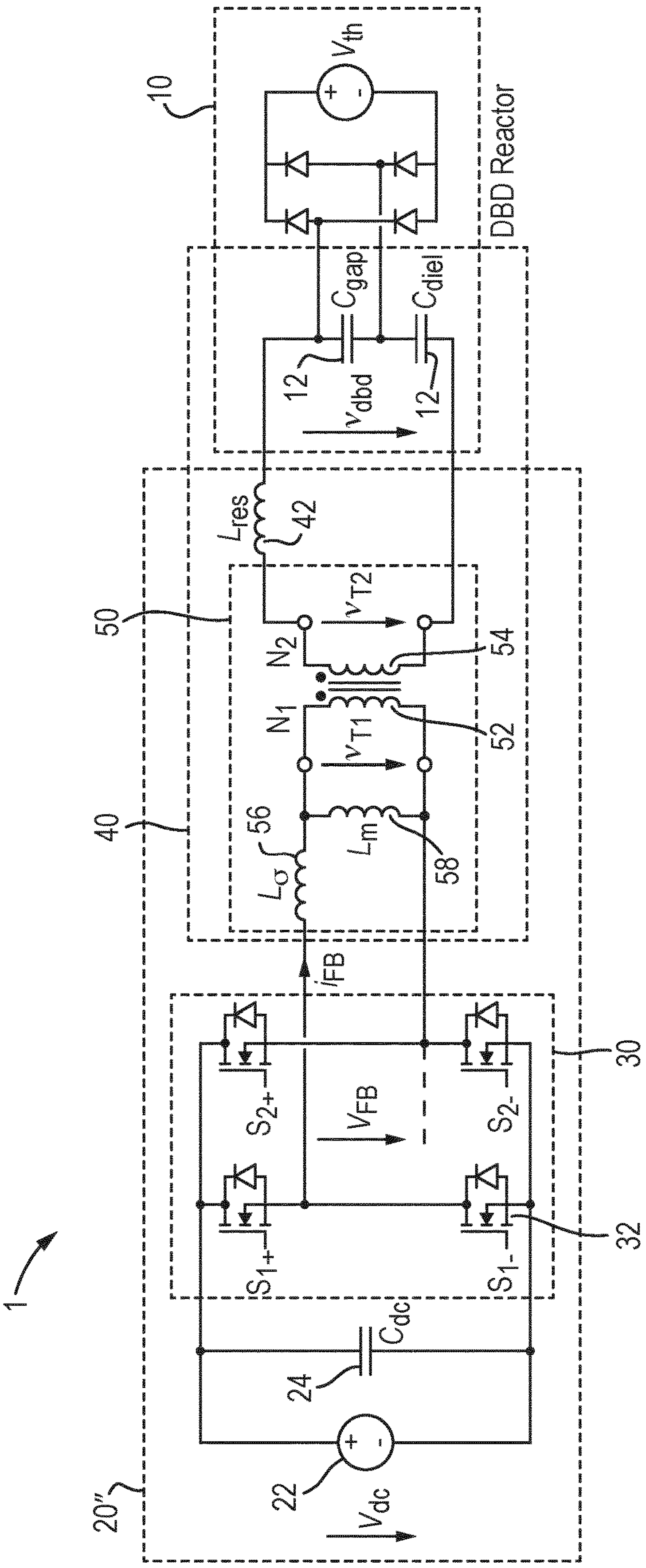
FIG. 7 shows another example circuit.

The three modes form a wavelet pulsed power process in the form of a pulse-train implemented by excitation of the resonant tank. The duration of the power transfer achieved using this process is determined by the length of time over which this excitation pulse-train is provided to the resonant tank. This is just one parameter of the excitation pulse-train that is determined by circuit by which the pulse-train is implemented. FIGS. 5, 6 and 7 show example circuits capable of being used to implement one or more pulse-trains.

Figure 12:
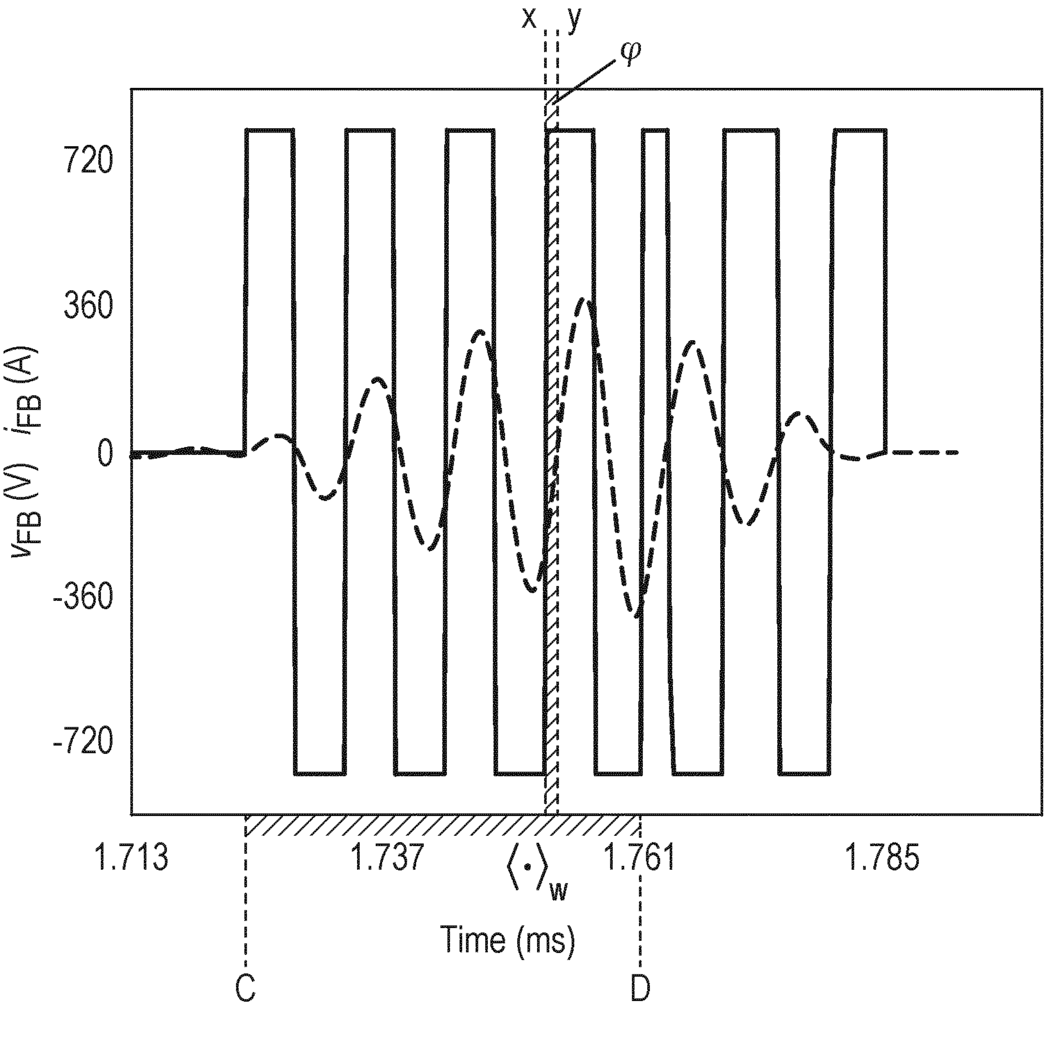
FIG. 12 shows a further example plot of voltage and current over time during an example pulse-train.

An example of the excitation applied to the resonant tank is shown in FIG. 12 below. As can be seen in that figure, in various examples, the excitation takes the form of a square wave voltage waveform, the waveform comprising multiple consecutive individual pulses that together form a pulse-train. This induces a sinusoidal current in a resonant tank (the current waveform shown in FIG. 12), and provides the waveforms at the DBD device shown in FIG. 3.

While FIG. 12 does not show the dielectric barrier electrical discharge threshold, or specific include markings separating the first, second and third modes, it is possible to see in these figures where the third mode begins. At time D in FIG. 12, it can be seen that the voltage waveform has a peak at a maximum positive value that has a shorter duration than the other peaks in the waveform. This occurs due to the transition from the second mode to the third mode. At this point, the excitation is stopped, meaning voltage is no longer actively provided to the resonant tank and DBD device.

Depending on the action taken at that stage, such as whether active or passive energy recovery is used, this causes a phase shift in the voltage waveform. Passive energy recovery is used in the simulation used to produce FIG. 12, and as such, the change in the applied waveform is caused by means of freewheeling of current in H-bridge diodes. An alternate active energy recovery means applied in some examples is 180 degree phase shift causing power to be drained instead. These processes are described in more detail below along with an example inverter providing the H-bridge.

In various examples, the transition to the third mode in examples according to an aspect disclosed herein is applied after a maximum number of discharge ignition events. A number of examples limit the maximum number of discharge ignition events to only a single discharge ignition event, or to up to about five discharge ignition events. When only a single discharge ignition event is used as the maximum number, or after the last discharge ignition event at a larger maximum number, the third mode is transitioned to directly after (such as immediately after) the maximum number of discharge ignition events have occurred.

Figure 4:
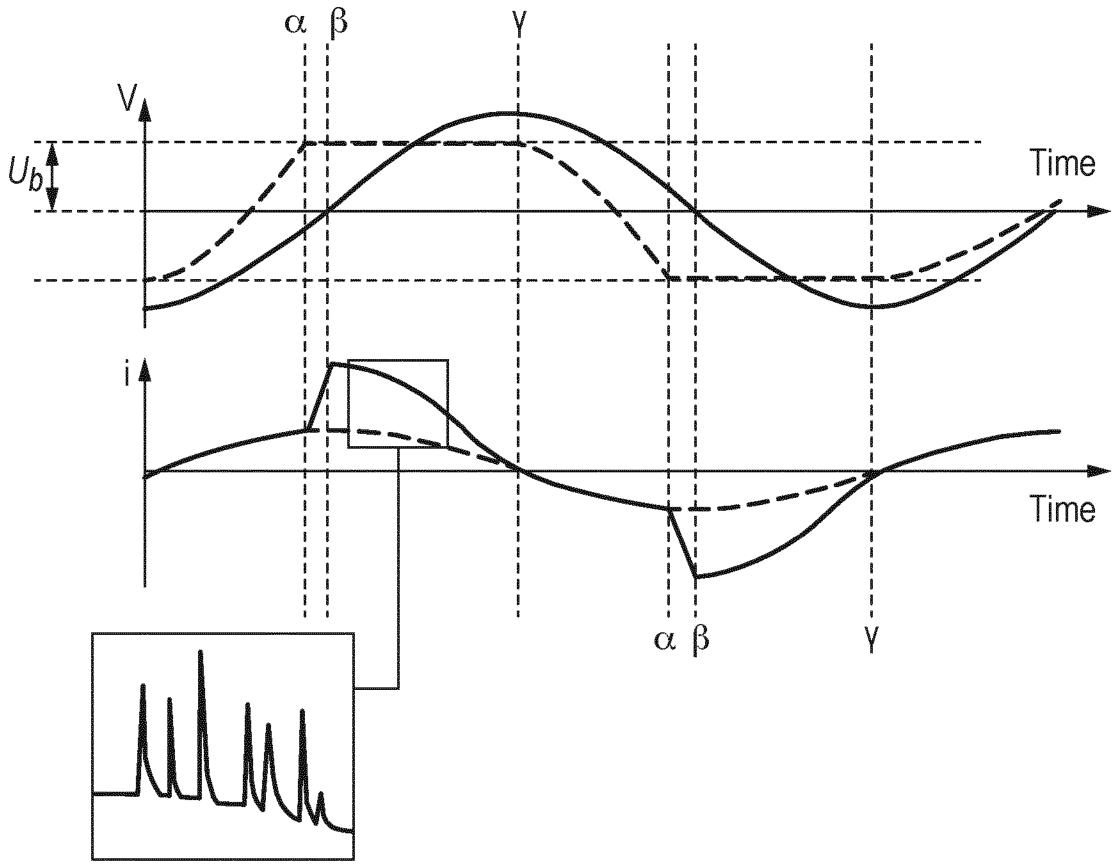
FIG. 4 shows example plots of voltage against time comparing applied gap voltage to output voltage and a corresponding plot with a magnified portion of output current against time.

In terms of how an example excitation applied to the DBD device translates into discharge, this is demonstrated by the plots shown in FIG. 4. This shows an upper plot and a lower plot. The upper plot is a plot of voltage against time and the lower plot is a plot of current against time.

The upper plot of FIG. 4 shows a solid line and a dashed line. The solid line is in the form of a sinusoidal wave that is at a minimum at time zero. In this example, this line corresponds to a voltage applied across a DBD device. The dashed line is in the form of a sinusoidal wave with its maximum and minimum peaks truncated to a plateau. As with the applied voltage curve, this is at a minimum at time zero, and, in this example, corresponds to a voltage across the discharge gap.

The amplitude of the gap voltage is less than the applied voltage amplitude. As the applied voltage transitions towards positive, the gap voltage increases. After about an eighth of a cycle of the applied voltage, the gap voltage turns positive. Just before the end of a second eighth of said cycle, the amplitude of the gap voltage reaches a threshold. In FIG. 4 this occurs at time a. This plateau is maintained until the applied voltage reaches a maximum, at time γ, in FIG. 4. At time γ, the process repeats itself, but with the polarities reversed, and continues to switch between movements in the positive and negative directions as long as the applied voltage continues.

As a comparison to the first, second and third modes set out above, the rise in the gap voltage corresponds, for example, to the rise in voltage during the second mode after the first fall in voltage during the second mode. From this it can be understood that discharge is able to occur during this period, and as such, the plateau in the gap voltage curve is due to the threshold voltage being reached.

The current plot of FIG. 4 shows the current at the gap induced by gap voltage. At time zero this has an amplitude of approximately zero. This increases in the form of a sinusoidal wave. Should the gap voltage not reach the threshold voltage (such as if the plots of FIG. 4 represented voltage and current during the first or third modes), then, as shown by the dashed line in the current plot in FIG. 4, the sinusoidal wave would proceed uninterrupted. However, at time α, due to the threshold voltage having been reached, ignition occurs. This causes ionisation of the medium in the discharge gap and electrical discharge to begin.

From time α, the gap current rapidly increases to a peak at time β, which corresponds to the zero-cross point of the applied voltage. Since time α is almost at the end of a quarter cycle of the applied voltage cycle, this is a very short period relative to the cycle of the current curve. From time β, the current then, in a sinusoidal manner, decreases to zero at time γ, at which point it returns to its original form and amplitude range. This cycle continues in parallel with the gap voltage and applied voltage.

As can be seen from this, the amplitude of the current is simply increased to an amplified level.

The main current plot of FIG. 4 shows a continuous curve between time α and time γ. As noted above this is the time during which discharge occurs. This period is therefore able to be considered to be a macro-discharge period, and time α is when a discharge ignition event occurs. As is shown by the magnified section of the current plot of FIG. 4, the current curve does not have a continuous form however. Instead, the curve is made up of many current spikes that are so close together that they cause the curve to appear continuous. Each spike represents a micro-discharge or transient filament, which is initiated from a single point on one of the electrodes (such as from a sub-macroscopic feature 130 on the electrode 120 shown in FIG. 2). It is the connection each of these filaments provide between the opposing electrodes (one electrode 110 of course having the dielectric layer 125 thereon as shown in FIG. 2) that causes the current spike because the filament provides a current path across the discharge gap. Due to these micro-discharges ionising the medium in the gap and passing high energy electrons into the medium, enough energy is present to drive chemical reactions that, for example, breakdown pollutants in the medium.

Drive Circuit Structure

Generally illustrated at 1 in each of FIG. 5, FIG. 6 and FIG. 7 is a circuit diagram of an example system suitable for providing dielectric barrier discharge. This system includes a DBD device 10, also referred to as a DBD reactor.

The DBD reactor 10 is represented in each of FIGS. 5, 6 and 7 by a model. The model is a diode bridge with a power input (also referred to as a power source) providing a voltage of $V_{th}$ in use. The electrodes of the DBD device are shown in the model as being connected across the diode bridge.

The electrodes (specifically the gap between the electrodes, which may be referred to as a "dielectric discharge gap") and the dielectric barrier mounted to one of the electrodes are represented in FIGS. 5, 6 and 7 by capacitors 12. This is because the electrical functionality the gap and dielectric barrier provide to the system when represented as a circuit is capacitance.

The capacitance provided by the dielectric discharge gap is shown as being connected directly across the diode bridge. The capacitance provided by the dielectric barrier itself is shown as being connected at one end to the diode bridge in parallel with the capacitance provided by the gap. The other end of the capacitance provided by the dielectric barrier is not connected to the diode bridge. This is instead connected to a drive circuit arranged to drive dielectric barrier electrical discharge across the gap between the electrodes.

While represented by a model in FIGS. 5, 6 and 7, the DBD device 10 capacitance is determined predominantly by the capacitance of the medium (typically gas, such as air) in the dielectric discharge gap. This is typically due to the dielectric constant of the medium being about 1 and the dielectric material being significantly higher than 1, such as between about 3 and 6 (when measured at about 20 degrees Celsius at about 1 kHz). As the medium and dielectric are connected in series, it is the smaller capacitance that is dominant, and therefore, due to these relative dielectric constants, the effective capacitance of the DBD device is governed by the medium.

Further, the contribution from the capacitance of the medium in the gap, this is approximately constant and does not depend on temperature of composition of the medium in the gap. This "air-gap" capacitance is therefore approximately constant because, as explained in more detail below, the pulse-trains used in examples according to an aspect disclosed herein limit the number of discharge ignition events to the extent that minimal change occurs to this capacitance. The same cannot be said however for known resonant systems. This is either due to the extended nature of the discharge causing a shift in the capacitance of the medium, or the medium is of a different nature, such as when surface dielectric barrier discharge devices are used.

The drive circuit is illustrated respectively at 20, 20' and 20" in FIGS. 5, 6 and 7. The drive circuit has a power source 22 connected to an inverter 30. The power source is provided by a DC power supply in the examples of these figures. This is a DC link voltage supply, $V_{dc}$, in the examples shown.

In the examples shown in FIGS. 5 and 6, the inverter 30 has a circuit loop connected across it. This circuit loop has a connection to the electrodes of the DBD device 10 connecting in series across the capacitance provided by the dielectric discharge gap and dielectric barrier. This closes the circuit loop connected across the inverter.

The example shown in FIG. 7 the inverter 30 has a transformer 50 connected across it. In this arrangement it is the primary side 52 of a transformer that is connected across the inverter. The secondary side 54 of the transformer has a connection to the electrodes of the DBD device 10 connecting in series across the capacitance provided by the dielectric discharge gap and dielectric barrier.

The connection across the capacitance of the DBD device 10, and the ability to connect across this capacitance in the examples of each of FIGS. 5, 6 and 7 causes the drive circuit 20 to be a separate, and in some examples separable, circuit from the DBD device.

In the examples shown in FIGS. 5 and 6, when the drive circuit 20, 20' is connected as set out above to the DBD device 10, a resonant tank 40 is formed between the inverter 30 and the capacitors 12 provided by the dielectric discharge gap and the dielectric barrier. The inductance of the resonant tank is provided in this example by an inductor 42 connected in series with the capacitance. Some inductance will also be provided by the wiring of the resonant tank. The inverter provides the power source for the resonant tank.

In the example shown in FIG. 7, when the drive circuit 20" is connected, as set out above, to the DBD device 10, a resonant tank 40 is formed between the transformer 50 and the capacitance 12 provided by the dielectric discharge gap and the dielectric barrier. The inductance of the resonant tank is provided by an inductor 42 connected in series with the secondary side 54 of the transformer and the capacitance in combination with stray/leakage inductance of the transformer represented in FIG. 7 by inductor $L_{\sigma}$ at reference numeral 56. This is shown in FIG. 7 as being connected in series with the transformer between the output from the inverter 30 and the input to the primary side 52 of the transformer.

The transformer 50 shown in the example of FIG. 7 also has magnetisation induction represented in the figure by inductor $L_m$ at reference numeral 58, connected in parallel with the primary side 52 of the transformer.

In addition to providing a step change in voltage and current based on the turns ratio in the transformer 50, the transformer also provides galvanic isolation. This suppresses electromagnetic interference across the transformer from the inverter 30 to the resonant tank. A conventional magnetic core transformer is able to be used in various examples. In other examples, an Air-Core Transformer (ACT) is able to be used. Compared to a regular (i.e. magnetic core) transformer, an ACT can have a very low coupling (such as 40% instead of 98% as would typically in a magnetic core transformer) between the windings.

This results in higher leakage inductance than in a regular transformer. However, this is desirable in some examples, since it allows several desirable functions for the drive circuit as a whole to be incorporated in a single component, namely galvanic isolation for safety and EMI suppression (since the transformer provides a noise barrier), voltage step-up and resonance inductance (as is discussed in more detail below). These functions are also able to be provided by a regular transformer but to a lesser extend in some examples.

Turning to the inverter 30 in more detail, in the examples shown in FIGS. 5 and 7, the inverter is provided by an H-bridge. The H-bridge has four switches 32 providing two high-side switches, $S_{1+}$ and $S_{2+}$, and two low-side switches, $S_{1-}$ and $S_{2-}$. In the example shown in FIG. 6, the inverter is provided by a half bridge. This has two switches 32 and two capacitors 34, with the switches providing one high-side, $S_{1+}$, and one low-side, $S_{1-}$, switch.

The switches 32 of the inverter 30 are, in the examples shown in FIGS. 5 to 7 provided by transistors. These are silicon carbide MOSFETs in the examples shown in these figures. In other examples, each switch is able to be provided by a MOSFET, such as an n-type MOSFET, silicon MOS- FET; or other types of electronic switches, such as Insulated Gate Bipolar Transistors (IGBTs), such as a silicon IGBT, Junction Field Effect Transistors (IFETs), Bipolar Junction Transistors (BJTs), or High Electron-Mobility Transistors (HEMTs), such as gallium nitride (GaN) HEMTs.

In the examples shown in FIGS. 5 and 7 a capacitor 24 is connected in parallel with the inverter 30 and voltage supply 22. This provides a DC link capacitance for the drive circuit 20. In the example shown in FIG. 6, this capacitance is provided by the capacitors 34 of the half-bridge inverter.

Drive Circuit Functionality

Figure 8:
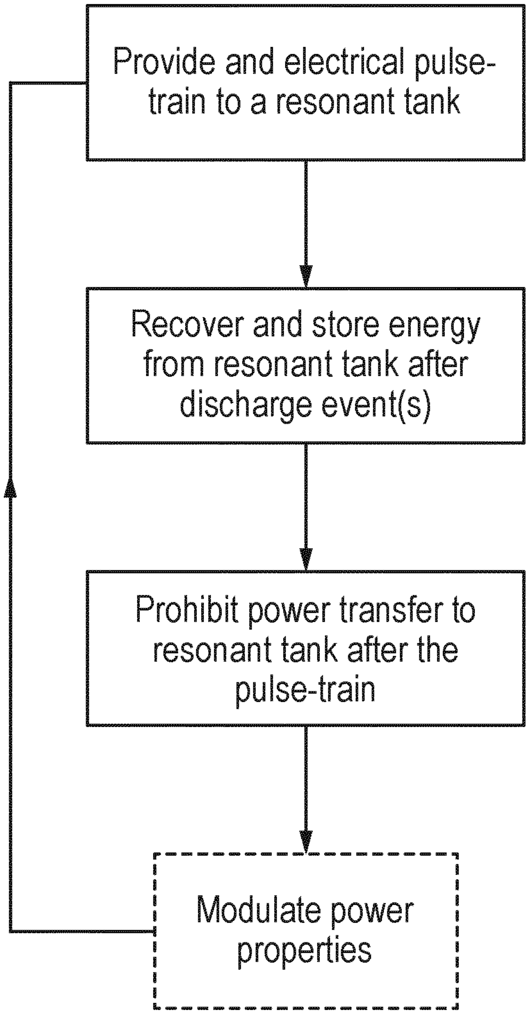
FIG. 8 shows an example method of operating an example circuit.

As shown in FIG. 8, the system is used to provide an electrical pulse-train to the resonant tank and to prohibit power transfer to the resonant tank after the pulse-train. There are also steps of modulating power properties in order to modify the pulse-train before a further pulse-train is provided and to recover energy from the resonant tank after the discharge ignition event(s) and store the energy. While there are examples where energy recovery is not included in this process, typically energy recovery is included in this process. The step of modulating power properties is optional however. The details of the process are set out in more detail below along with further details of power modulation and energy recovery processes.

During use of the system 1, the power supplied to the DBD device 10 needs to reach at least the dielectric barrier electrical discharge voltage level ($V_{th}$). This is needed in order to stimulate dielectric barrier electrical discharge across the discharge gap. The model circuit shown in FIGS. 5, 6 and 7 for the DBD device shows the ability of the device to accept power and voltage clamping across the gap when $V_{th}$ is reached. The power absorbed by the DBD voltage source shown in these figures is given by the product of $V_{th}$ and the current impressed in the resonant tank (when the diodes are conducting). As such, when the voltage across the gap exceeds $V_{th}$, the corresponding pair of diodes in the model circuit of the DBD device are conducting, and power is being transferred to the (model) $V_{th}$ voltage source depicted in the figures, representing a power transfer to the plasma. In this model, the voltage across the gap is clamped to $V_{th}$ whenever dielectric barrier electrical discharge occurs.

The power to provide the dielectric barrier electrical discharge voltage is provided by the drive circuit 20 as a pulse-train. The power provided by the pulse-train is drawn from the DC link voltage source 22 at a level of about 800 V. This is fed to the inverter 30. In other examples, the voltage provided by the DC link voltage source is up to 900 V when using a silicon carbide MOSFET, and can be higher, such as 1.2 kV to 1.3 kV when using a 1.7 kV rated silicon carbide transistor.

To initiate the pulse-train, when using the system in the example shown in FIG. 5, as power is drawn from the DC link voltage source 22, the H-bridge is then used to excite the resonant tank 40. In this example this is achieved by the H-bridge outputting a 100% duty-cycle square wave voltage over the duration of the first two modes of the pulse-train (as set out above in relation to FIG. 3).

The switches 32 of the H-bridge are arranged to provide output at a switching frequency tuned to excite the resonant tank 40 at the resonance frequency of the tank. This causes only real power to be processed by the H-bridge. In order to minimize switching losses, operation slightly above the resonance frequency is feasible to achieve ZVS of the switches.

As set out above in relation to FIG. 3, the excitation of the resonant tank 40 causes dielectric barrier electrical discharge once the voltage level in the resonant tank 40 reaches W. This transfers power into the plasma between the electrodes in the DBD device 10.

When the second mode of the pulse-train is to be ended, the switches 32 are turned off. When using transistors as in the examples shown in FIGS. 5 to 7, this is achieved either by turning the transistors off apart from the transistor body diodes (or external anti-parallel diodes), which are left active, or the bridge voltage ($v_{FB}$) across the inverter 30 is phase-shifted by 180 degrees (°) in order to respectively passively or actively recover the remaining energy stored in the resonant tank 40.

The recovered energy is transferred to the DC link capacitor 24 (this corresponds to the capacitors 34 of the inverter 30 when the example drive circuit 20' shown in FIG. 6 is used instead of the example drive circuit 20 shown in FIG. 5 or the example drive circuit 20" shown in FIG. 7). This is achieved by the reversal of the power flow through the passive or active recovery described in the previous paragraph. This allows this energy to contribute to the energy used for the next pulse-train.

Passive power recovery is achieved by the transistors in the inverter 30 simply being switched off at the end of the second mode (i.e. when dielectric barrier electrical discharge is to be ended), as referred to above. Due to the arrangement of the circuit in an H-bridge or half bridge, this removes all circuit paths through the transistors and leaves a path through the transistor body diodes (which, as shown in FIGS. 5, 6 and 7 provide a connection across the transistors). The connection of the resonant tank across the inverter as shown in FIGS. 5, 6 and 7 relative to the diodes allows energy to flow through the diodes and into the DC link capacitor 24, 34 when the transistors are switched off.

Active power recover is instead achieved by making use of the transistors to provide a 180° phase shift in the output of the inverter 30 from the phase of the output in the second mode. Instead of allowing energy to flow into the DC link capacitor 24, 34, as occurs during passive power recovery, this drives the energy into the DC link capacitor.

The quality factor (Q) of the resonant tank equates to the voltage gain of voltage across the dielectric discharge gap ($v_{dbd}$) to the bridge voltage (i.e. $Q=v_{dbd}/v_{FB}$) at the resonance frequency (without transformer or unity turns-ratio, which would make the quality factor as $Q=v_{dbd}/(v_{FB}/n)$, where n is the turns ratio of the transformer; the total gain when using a transformer would also be determined from the transformer step-up plus the resonance gain). The effective voltage gain of the resonant tank is determined by the power losses imposed by the parasitic resistances of the magnetic components and the wires connecting the electrodes of the DBD device which provide damping to the circuit. Unlike known systems that use resonant converters, in examples according to an aspect disclosed herein the effective voltage gain is not determined by the actual power being delivered to the plasma since there is no discharge occurring during charging of the resonant tank. For this reason, practical values of Q of greater than 40 allow dielectric barrier electrical discharge voltages above 30 kV from the 800 V DC link input voltage without the explicit need of a step-up transformer.

It can therefore be appreciated that once power is being absorbed by the onset of discharge ignition events in the DBD device, a lower voltage gain may cause a self-quenching effect due to the damping this causes and the Q value shift. However, since only a few discharge ignition events are wanted from each pulse-train (such as between one and about five discharge ignition events) and because there is enough momentum in the resonant tank (stored energy much larger than energy absorbed by electric discharges), this does not impose any practical challenges for the examples according to an aspect disclosed herein. On the other hand, known resonant converters are configures for comparably low voltage gains resulting from continuous power absorption by the plasma and therefore need, and are designed with, high step-up transformer turns-ratios.

The voltage across the dielectric discharge gap is determined by the capacitance of the dielectric discharge gap. This is made up of the capacitance of the dielectric and the capacitance of the gap itself. In the examples in FIGS. 6 and 7, the capacitance of the dielectric ($C_{diel}$) is typically much larger than the capacitance of the gap ($C_{gap}$). For example, $C_{diel}$ is typically at least ten times larger than $C_{gap}$. This also gives a voltage ratio of voltage across the gap ($V_{gap}$) compared to the voltage across the dielectric ($V_{diel}$) of at least 10.

The process of recovering energy can be applied in a corresponding manner using the drive circuit 20' of the example shown in FIG. 6. When using the drive circuit 20" of the example shown in FIG. 7, the same process as is able to be applied for the drive circuit 20 of the example shown in FIG. 5 can be used.

The power being provided by the DC link power supply is the power provided to the drive circuit averaged over the pulse-train repetition interval. The energy exchanged between the DC-link capacitor and the resonant tank during resonant tank charging, power transfer during dielectric barrier electrical discharge, and resonant tank discharging typically causes a voltage ripple across the DC link capacitors. The interval where power is transferred to the plasma by dielectric barrier electrical discharge also contributes to the DC-link voltage ripple.

In the example shown in FIG. 7, the transformer 50 provides a step up ratio of between about 1:1 and 1:10. This lower step up ratio that those of conventional pulsed-power circuits (example step-up ratios of which are set out above), allows the current passing through the primary side 52 of the transformer to be limited.

When a ratio of 1:1 is used, this only provides galvanic isolation instead of providing galvanic isolation and step up in voltage when a higher step-up ratio, such as a step up ration of 1:10, is used.

The inductor 42 used in the drive circuit 20" of FIG. 7 can be located on either the primary side or secondary side of the transformer 50. However, by locating the inductor on the secondary side (and therefore high voltage side), as mentioned above, the kVA rating of the transformer is able to be reduced. The reactive power of the DBD device 10 can then be directly compensated. Under such a reactive load matching condition, only the real power is processed by the transformer.

The galvanic isolation imposed by the transformer 50 reduces ground currents, which are currents flowing in the parasitic capacitance between electrodes of the DBD device 10 and any surrounding metallic housing. This assists in meeting electromagnetic compatibility (EMC) limits.

The duration of each wavelet pulse-train determines the number of dielectric barrier electrical discharge ignition events. As can be seen from FIG. 9, for a given $V_{dc}$, the number of excitation periods $n_p$ (i.e. frequency cycles) defines the effective duration of the wavelet pulse-train and the number of dielectric barrier electrical discharge ignition events once $V_{th}$ has been reached in the resonant tank. This therefore determines the amount of energy transferred to the plasma per pulse-train.

The real power is adjusted by moving the bridge-leg switching frequency away from the resonance frequency. This can be achieved by increasing the switching frequency above the resonance frequency or lowering the switching frequency below the resonance frequency. This causes a phase-shift between the v FB and the bridge current $i_{FB}$, and thus lowers the real power being transferred to the DBD reactor.

By taking this approach the high voltage gain is lowered and processing of reactive power increases. In order to maintain the high voltage gain and minimise the processing of reactive power, instead, in accordance with aspects of the present disclosure, the inverter 30 is able to be arranged in use to provide excitation close to the resonance frequency. This is achieved by keeping the phase shift between $v_{FB}$ and $i_{FB}$ close to zero. The average power is adjusted by varying the repetition frequency of the wavelet pulse-trains (i.e. how frequently a wavelet pulse-train is used to excite the resonant tank to cause dielectric barrier electrical discharge). This allows very high partial load efficiency to be achieved since the resonant tank is always operated at its resonance and therefore there is little to no processing of reactive power.

As mentioned above, the length of a pulse-train is variable. A pulse-train of one durations can be seen in FIG. 9. The pulse-train illustrated in FIG. 9 is a short pulse-train, such as one that is able to be used with an example according to an aspect disclosed herein due to it producing between two and four discharge ignition events.

Figure 9:
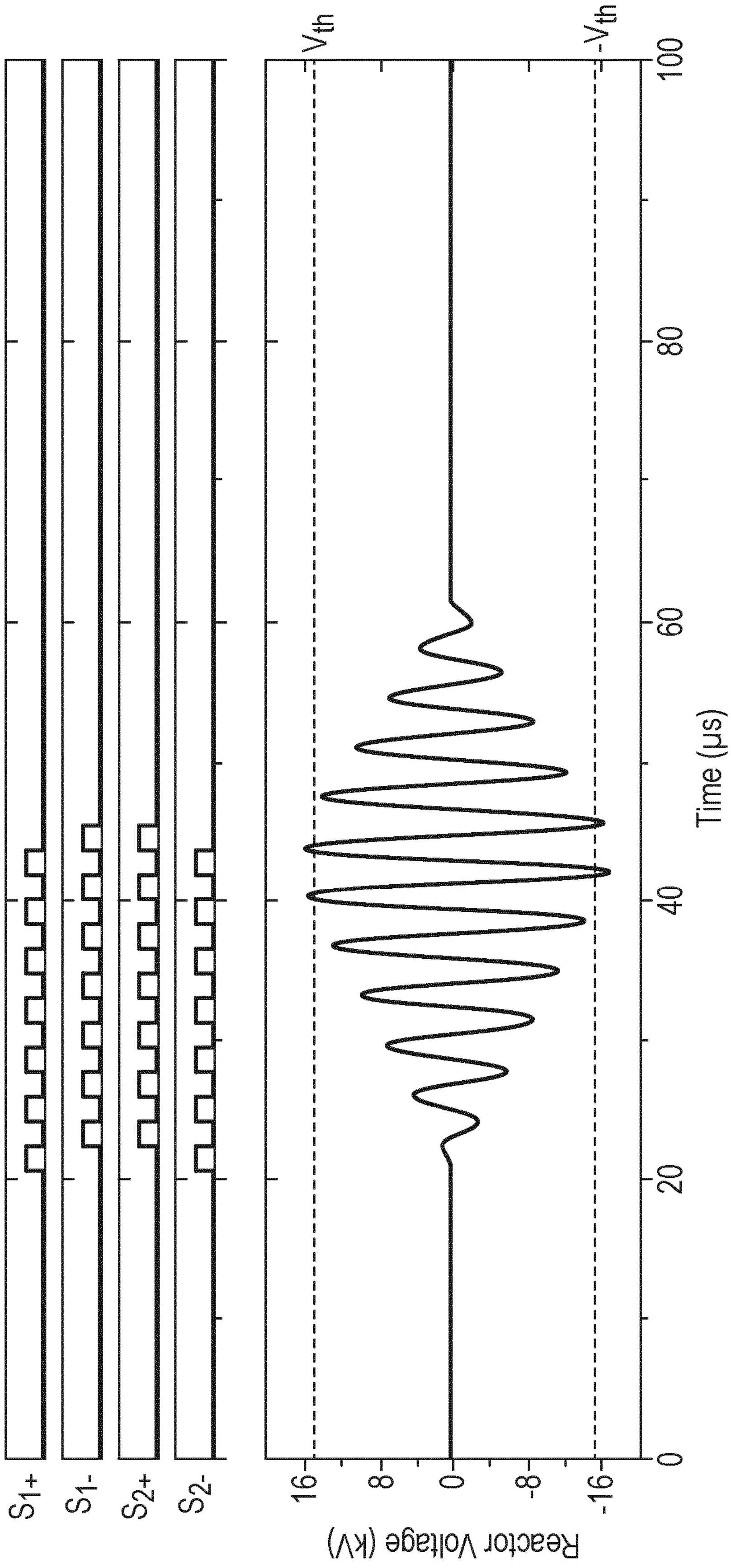
FIG. 9 shows an example plot of switching sequence over time and resulting voltage over time.

In FIG. 9 the pulse-train is generated by an example drive circuit such as those shown in FIG. 5 or FIG. 7. Of the two plots shown in this figure, one plot shows the state of the switches 32 within the H-bridge inverter 30. These are either in an off state (a "0" state) or an on state (a "1" state). By operating these switches in pairs, the wave pattern shown in the lower plot of Figures is producible at the DBD device.

The switch pairs are the $S_{1+}$ switch paired with the $S_{2-}$ switch, and the $S_{i-}$ switch paired with the $S_{2+}$ switch. During the first two modes of a pulse-train, the switches of each pair (i.e. the two switches within the respective pairs) are operated in phase, causing each switch to be in the same state as the other switch of the pair. In the first two modes of a pulse-train, the pairs are operated out of phase, meaning that when the switches of one pair are in one state, the switches of the other pair are in the other state.

As is conventional with an inverter, there is a "dead-time" or "interlocking time" between the switches $S_{1+}$ and $S_{1-}$ being switched from one state to the opposing state. This dead-time is a period of time where both the switches are turned off.

This period is typically several hundred nanoseconds. This period is provided as a safety interval to avoid the DC-link power supply being accidentally shorted, since this would cause a catastrophic failure within the system.

By having the switch pair $S_{1+}$ and $S_{2-}$ in the on state and the switch pair $S_{1-}$ and $S_{2+}$ in the off state, this causes a positive voltage increase. By reversing the states, so having the switch pair $S_{1+}$ and $S_{2-}$ in the off state and the switch pair $S_{1-}$ and $S_{2+}$ in the on state, this causes a negative voltage increase. By alternating this arrangement, a sinusoidal waveform as shown in the lower plot of FIG. 9 is produced with the frequency of the waveform being determined by the length of time each switch pair is in an on and off state.

In FIG. 9 each switch pair is operated for seven on-off cycles, with the $S_{1+}$ and $S_{2-}$ pair being the first pair to be in the on state. This generates a pulse-train with a duration of around 40 μs and a voltage of at least $V_{th}$ for about 1.75 cycles. When the switch pair on-off cycles are stopped, the third mode of the pulse-train occurs until the voltage returns to 0 V. Additionally, in the pulse-trains illustrated in FIG. 9 the first mode and third mode of each pulse-train have approximately the same duration.

Figure 10:
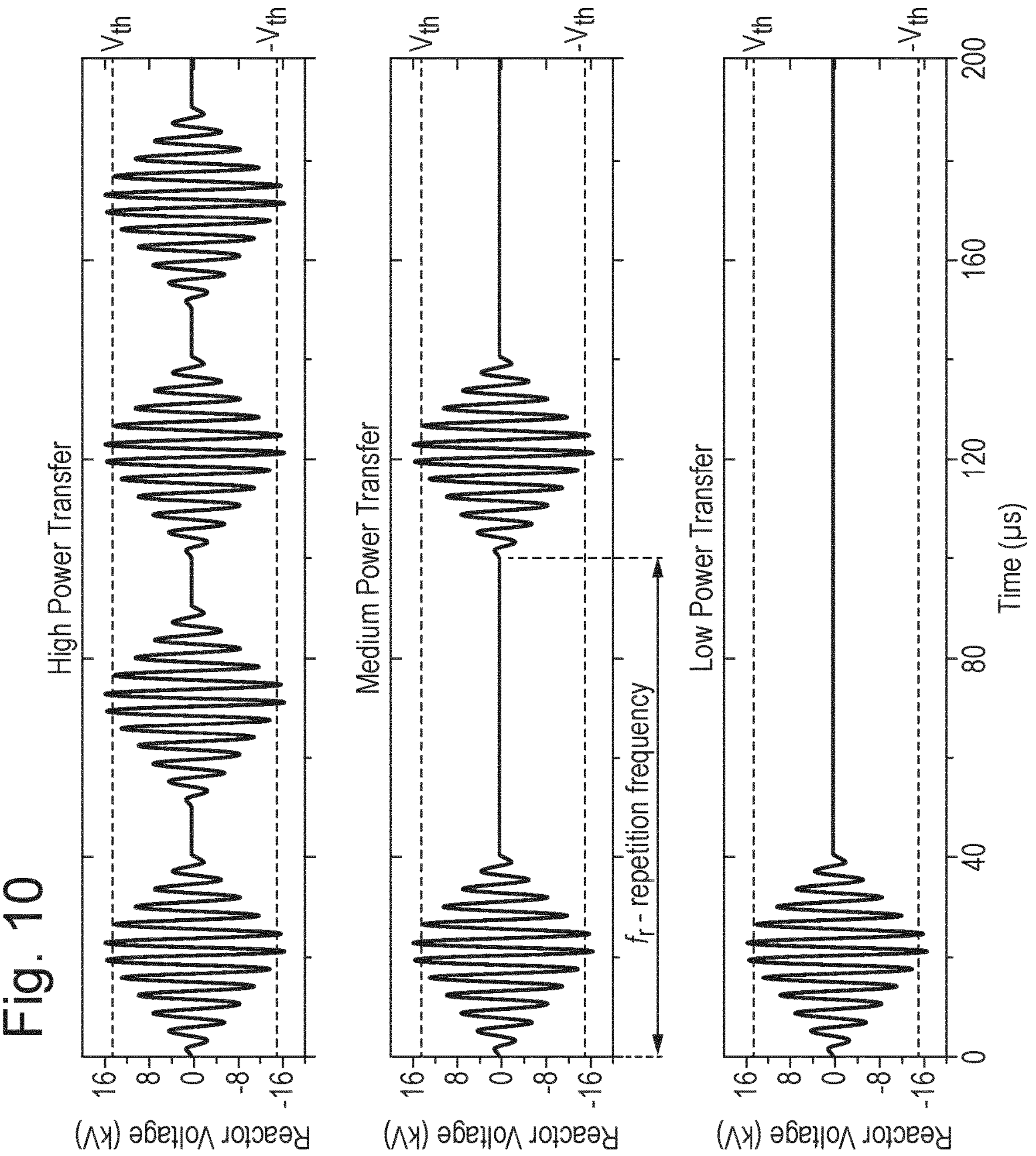
FIG. 10 shows example plots for voltage over time for power transfer rates.

FIG. 10 shows a mechanism for varying the amount of power transferred to the plasma. As mentioned above, a further mechanism for altering the amount of power transferred to the plasma is to vary the frequency of pulse-trains (i.e. the number of pulse-trains per unit of time). This is referred to as the repetition frequency ($f_r$). Three different power transfer levels are shown in the three plots of FIG. 10.

Each plot in FIG. 10 illustrates about a 200 μs period. At a low power transfer rate, such as in the bottom plot of FIG. 10, there may be one pulse-trains thereby defining an $f_r$ of about 5 kHz (equivalent to the reciprocal of 200 μs) with each pulse-train having a duration of about 40 μs. In the plot above this in FIG. 10, the $f_r$ is about 10 kHz (equivalent to the reciprocal of 100 μs) with a pulse-train duration of about 40 μs. This second plot provides a medium power transfer rate. A (very) high power transfer rate is exemplified by the plot at the top of FIG. 10 (a third plot). In this third plot the $f_r$ is about 18 kHz (equivalent to the reciprocal of 55 μs) with a pulse-train duration of about 40 μs. In each of these three plots the pulse-trains are distinguishable from each other due to the increase and then decrease in voltage amplitude of each pulse-train being determinable. With each pulse-train, dielectric barrier electrical discharge occurs when the voltage increases to at least $V_{th}$. Dielectric barrier electrical discharge then stops as the voltage decreases below $V_{th}$.

Control and Feedback

Parameters within the system 1 may vary over time and/or during use. For example, the effective capacitance of the reactor is influenced by the process parameters (such as temperature, humidity, gas flow rate and other properties). Accordingly, a feedback mechanism to monitor and respond is used in conjunction with the DBD reactor 10 and drive circuit 20, 20', 20". This is provided in the form of a controller as generally illustrated at 200 in FIG. 11, which is connected in use to the drive circuit.

According to various examples, the controller is able to adjust average power delivered to the DBD reactor 10. This can be achieved by varying the number of pulses in a pulse-train and/or pulse repetition frequency (i.e. repetition frequency of pulses within a pulse-train) and/or pulse-train repetition frequency. In some examples the controller is able to track the resonance frequency of the resonant tank. As noted, the resonance frequency can change due to the conditions of the fluid passing through the reactor and also changes when power is being transferred to the gas. The natural frequency can also be a damped or un-damped natural frequency, which affects any frequency to which the tracked frequency may be compared. There are examples in which the frequency of the input to the resonant tank is able to be adjusted within the duration of a pulse-train, such as to update the frequency after each individual pulse of the pulse-train. The frequency of the input to the resonant tank is also able to be kept constant within a pulse-train and adjusted only between consecutive pulse-trains.

An example monitoring and response process using the controller 200 is set out below. The controller 200 has a phase detection unit 210. The phase detection unit is connected to an output of the inverter 30. This allows the phase detection unit to measure the $v_{FB}$ and $i_{FB}$, thereby obtaining feedback by monitoring these parameters. From these measurements a phase angle (φ) is able to be calculated by the phase detection unit. The unit can then average the phase angle over the $n_p$ excitation periods of a pulse-train to provide an output of a pulse-train averaged phase ($\langle\varphi\rangle_w$).

In some examples, the measurement of φ is achieved by detecting the point (such as a time) of the zero-crossing (ZC) of the current, $i_{FB}$, relative to the point of the voltage, $v_{FB}$, switching from negative to positive. While it would be possible to use the ZC for the voltage relative to the current, since the voltage is produced by a switching action in the inverter 30, that is determined by the controller 200, such a voltage ZC measurement may not be needed since it can be reconstructed. There are other methods, closely related to this and the use of current ZC, which can be used directly as a means of feedback. As such, a phase control approach, such as is set out herein is able to, but not required to, rely on ZC detection.

As shown in FIG. 12, φ is calculable from the difference in start time at time X of the zero cross point of $v_{FB}$, represented by the square waveform, and the time of zero cross point at time Y of current $i_{FB}$. The pulse-train averaging window ($\langle\cdot\rangle_w$) indicated in FIG. 12 by the time window between time C and time D is the time period over which the phase angle is averaged. The time period from time C to time D starts at the start of the beginning of the pulse-train (i.e. when the excitation of the resonant tank is started. This period extends through the period during which the resonant tank is charging to the point at which the ignition voltage amplitude ($V_{th}$) is reached (i.e. when dielectric barrier electrical discharge begins) allowing power transfer to occur. This time period ends at the time the excitation is stopped.

Excitation is stopped in order to stop discharge ignition events occurring. This limits the number of discharge ignition events to the maximum number of wanted discharge ignition events. In some examples the point at which to stop the excitation is determined based on the number of pulses in a pulse-train compared to a pre-set number of pulses for an excitation period during the pulse-train. In a number of other examples however, instead of operating based on a number of pulses arrangement, an arrangement that detects when discharge ignition events occur is used. Detection of the first (and potentially of subsequent discharge ignition events) occurs allows the number of discharge ignition events occurring over the following period to be known, calculated or predicted, and once. This allows excitation to be stopped when a maximum number of discharge ignition events has been reached, whether that be one, two, three, four, five or another number of discharge ignition events.

To detect when a discharge ignition event occurs, detection of a phase shift occurs. In various examples, this is detection on the instantaneous phase, instead of an averaged phase as is typically used when modulating the frequency of pulses in a pulse train for tracking the resonance frequency as set out above and below in relation to FIG. 11. This detected phase shift is a voltage-current phase-shift measured at the H-bridge terminal. During charging of the resonance tank there is close to zero phase difference between the voltage and current at the terminals. However, once a discharge ignition event occurs (i.e. the plasma ignited) there is a shift in the resonance frequency because of the increase in capacitance imposed by the "ignited" DBD device. This resonance frequency shift can be detected immediately by monitoring for a corresponding phase-shift.

This monitoring is able to be conducted, in a number of examples, using the controller 200, such as by using the phase detection unit 210. As noted above, in such examples, this is connected to the inverter terminals.

In examples where the maximum number of discharge ignition events is one discharge ignition event, the excitation is stopped once the first discharge ignition event is detected. In examples where the maximum number of discharge ignition events is higher (such as up to about five), the excitation is able to be stopped by then counting the number of subsequent pulses and equating each pulse to, for example, one discharge ignition event. Alternatively, identifying further discharge ignition events is able to be achieved by continuing to monitor the phase and identifying when each discharge ignition event occurs by its effect on the voltage-current phase at the inverter terminals.

In various examples, the phase detection unit 210 is provided by analogue circuitry. In other examples the phase detection unit is digitally implemented using a Field Programmable Gate Array (FPGA).

Using an FPGA, or another (such) digital implementation of the phase detection unit 210, greater flexibility is able to be achieved than if an analogue circuit is used, such flexibility includes changing the controller by upgrading software and not needing to design a new physical circuit and replace an existing circuit when an upgrade is wanted.

The use of an FPGA or analogue circuit also allows the phase angle to be calculated and fed through the controller 200 after each pulse cycle in the pulse-train. Using FIG. 12 as an example, such a cycle is a single cycle of the v FB square wave and/or single cycle of the i FB wave. This provides a higher performance system since it allows the PI controller 230, shown in FIG. 11 and on which more detail is provided below, to determine a new frequency set point, allowing adjustments to be made to a pulse-train during the duration of the pulse-train. As a contrast, by using a pulse-train averaging window, it is only possible for the PI controller to provide an input for an adjustment a property of the next pulse-train, not the pulse-train that is currently in progress.

Figure 11:
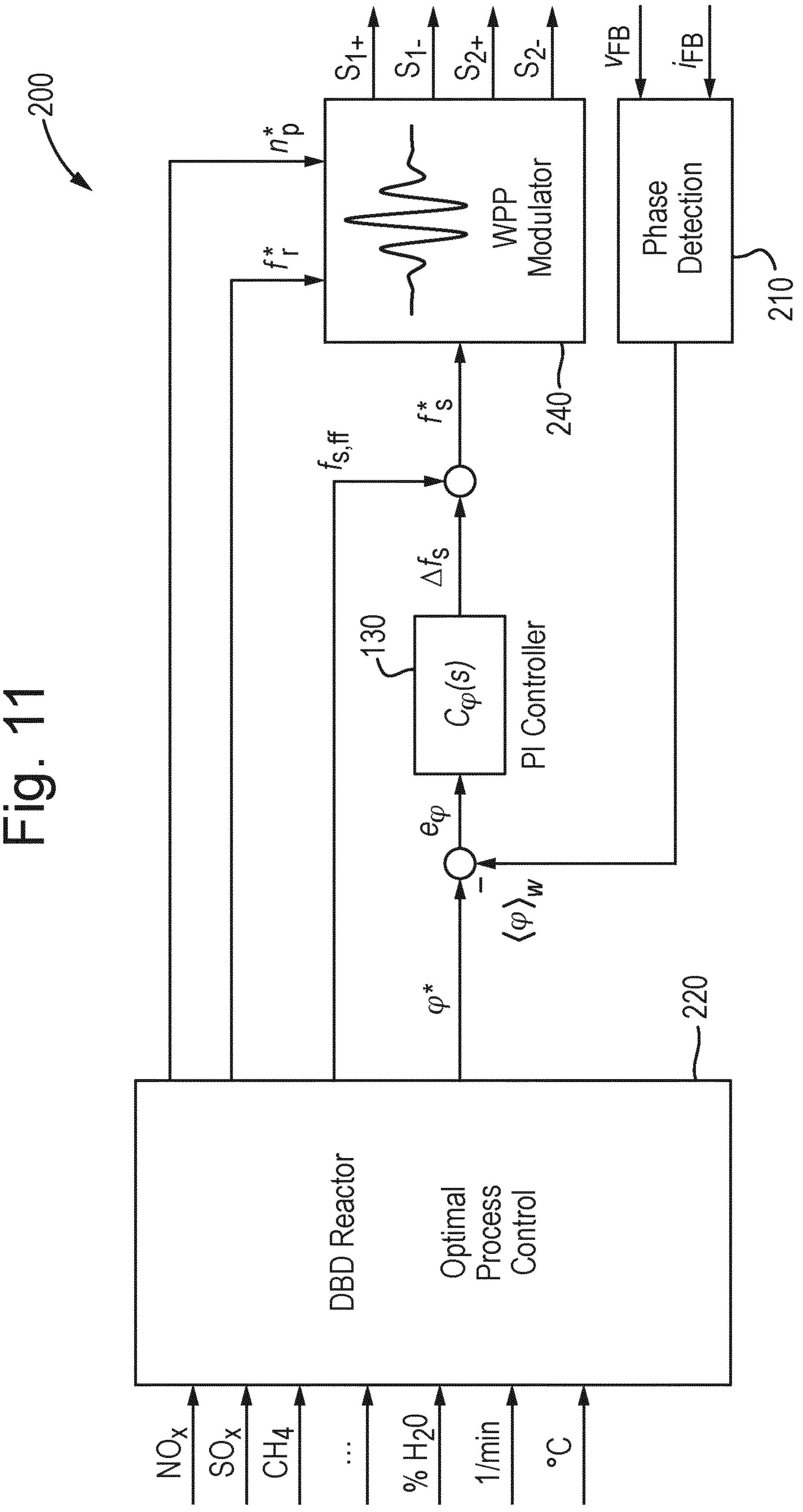
FIG. 11 shows an example controller for an example circuit.

Once the $\langle\varphi\rangle_w$ is calculated, this is compared by the controller 200 to a phase reference value ($\varphi^*$). The $\varphi^*$ is provided from a process control unit shown at 220 in FIG. 11 of the controller 200. This is derived from the properties of the gas passing through the DBD device 10. The properties shown in FIG. 11 are quantity of NOx, quantity of SOx, quantity of $CH_4$, percentage humidity (% $H_2O$), flow rate (litres per minute, l/min) and temperature (° C.), which, in this example, are provided as inputs to the process control unit. This provides further feedback by monitoring the properties and content of the gas passing through the DBD device. Although not shown in FIG. 11, quantity of nitrous oxide ($N_2O$) may also be included as an input to the process control unit.

Quantity inputs (such as quantity of NOx, SOx, $CH_4$ and/or $N_2O$) to the process control unit 220 in FIG. 11, in this example, are provided in parts per million (ppm). Different units for the measurements are able to be used in other examples.

As indicated by the " . . . " notation as an input to the process control unit in FIG. 11, quantities of other constituents in the gas are also able to be monitored and provided as an input.

The desired quantities of some or each of the constituent chemicals expected to be present in the gas are provided to the process control unit 200. This allows the quantity inputs to be compared to desired quantities of each of the relevant chemicals. Any difference between quantity input and desired quantities and/or quantity inputs and/or one or more of the other gas properties are then used to determine an output of the process control unit.

In the example shown in FIG. 11, the output includes $\varphi^*$, which represents an optimum phase angle. This is typically close to zero (such as at about 0°), or, if zero voltage switching (ZVS) is being applied, an phase angle of about +5° to about +15°.

The output of the comparison between $\langle\varphi\rangle_w$ and $\varphi^*$ is an error ($e_\varphi$) in the phase angle calculated from the monitored output from the inverter 30. This error is input to a compensator, shown as Proportional Integral (PI) controller 230 in FIG. 11. The PI controller calculates a frequency variation ($\Delta f_s$) based on the $e_\varphi$.

A contributing factor able to be used in determining the $e_\varphi$ is the gain attainable based on the phase angle and how the inverter output frequency relative to the resonant frequency is shifting the phase angle.

In a drive system according to various examples described herein, the gain factor (a simple multiple) that is achieved is typically between about 30 and about 50 times. This corresponds to a gain from about 800 V input at the DC-link power supply 22 to about 30 kV for the dielectric barrier electrical discharge threshold at the dielectric discharge gap. This corresponds to a gain of about 30 to about 34 decibels (dB).

The controller 200 adds the $\Delta f_s$ to a nominal resonance frequency feedforward term ($f_{s,ff}$) output from the process control unit 120 based on the inputs to that unit. This provides a frequency set point ($f_s^*$).

The process control unit 220 also outputs an $f_r$ set point ($f_r^*$) and an $n_p$ set point ($n_p^*$) based on the unit inputs and processing conducted by the process control unit. The $f_s^*$, $f_r^*$ and $n_p^*$ are provided by the controller 200 to a modulator unit 240. The modulator unit uses these to generate switching signals for the switches of the inverter 30 to modulate the excitation provided to the resonant tank 40. When the inverter is an H-bridge, these are switching signals for each of the four switches (as shown in the example controller of FIG. 11). When the inverter is a half bridge, these are switching signals for each of the two switches.

The switching frequency that is typically applied in example systems is between about 100 kHz and about 10 MHz. The $f_r^*$ is typically in the range of about 100 Hz to 50 kHz. This latter parameter is also, in various examples, the rate at which the controller 200 is operated (i.e. the rate at which the various parameters used and updated by the controller). This lowers the performance requirements for the controller than if a higher operation rate were used.

The system 1 is able to be used with a number of different size gas flows, such as various sizes of engines and boilers. As such, there are examples in which an exhaust gas purification system or other system applying the drive circuit 20, 20', 20" and controller 200 described above are implemented in a modular manner.

Figure 13:
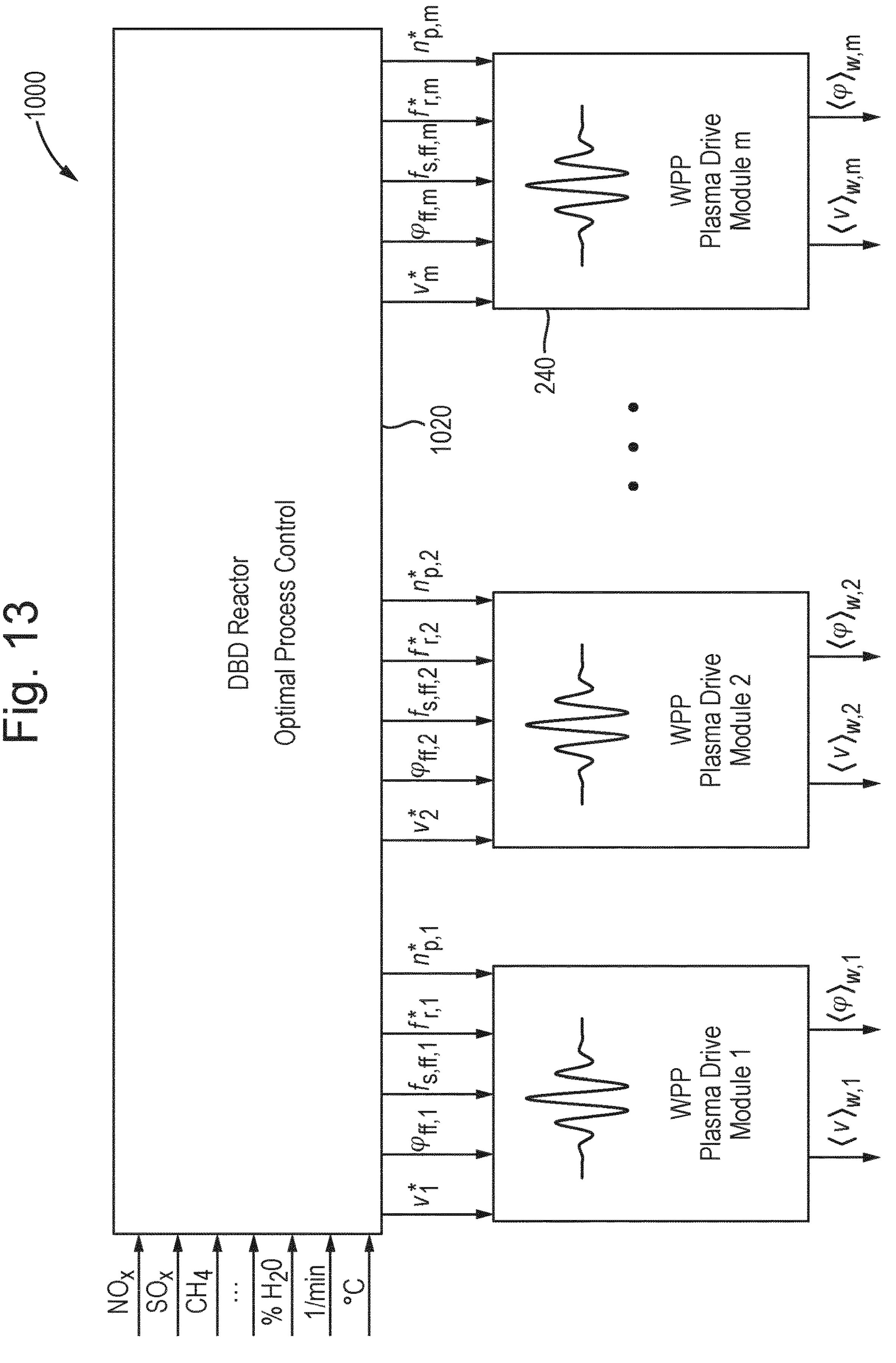
FIG. 13 shows a further example controller.

In such examples, there are a plurality of DBD devices 10, connected in series along a gas flow. A drive circuit 20, 20', 20" is typically provided for each DBD device. As shown in FIG. 13, a global controller 1000 is able to be implemented. This applies the same process as the controller 200 as described in relation to FIG. 11 and uses the same components. The inputs for the phase detection are provided from each drive circuit. The properties of the gas are input into a global process control unit 1020. A modulator unit 240 is provided for each drive circuit to drive the switches for the inverter of each drive circuit. As such, individual set points of the same types as provided to the modulator unit 240 shown in FIG. 11 are provided to the respective drive circuits from the global controller. This provides tailored control of each drive circuit. The number of modulator units 240 is determined by the number of drive circuits. As such, the number varies depending on the size of gas flow being processed.

When multiple drive circuits are used, there are examples where a single DC power supply is arranged to provide power to all the drive circuits. In other examples each drive circuit has its own DC power supply. In examples with a single DC power supply, a single AC/DC rectifier is able to supply DC power to each of the individual drives, thereby providing one DC-link power supply. As an example implementation of each drive circuit having its own DC power supply, each drive circuit is able to be equipped with an individual AC/DC rectifier and a 3-phase AC voltage supply. In such examples, the DBD devices 10 are typically electrically connected in parallel while still being connected, in the gas flow, in series (i.e. sequentially along the gas flow path).

Of course, by having multiple drive circuits, various examples have multiple DBD devices. Since these are arranged in parallel, this causes the overall capacitance of the system 1 to increase as the sum of the capacitance of each DBD device. This allows capacitances of, for example, up to 45.0 nF to be achieved, and possibly 1.0 nF.

Optimisation

When a system 1 is used applying an example using a step up transformer, such in the example shown in FIG. 7, ringing can occur between the magnetising inductance 58 of the transformer 50 and the DBD device 10.

Figure 14A:
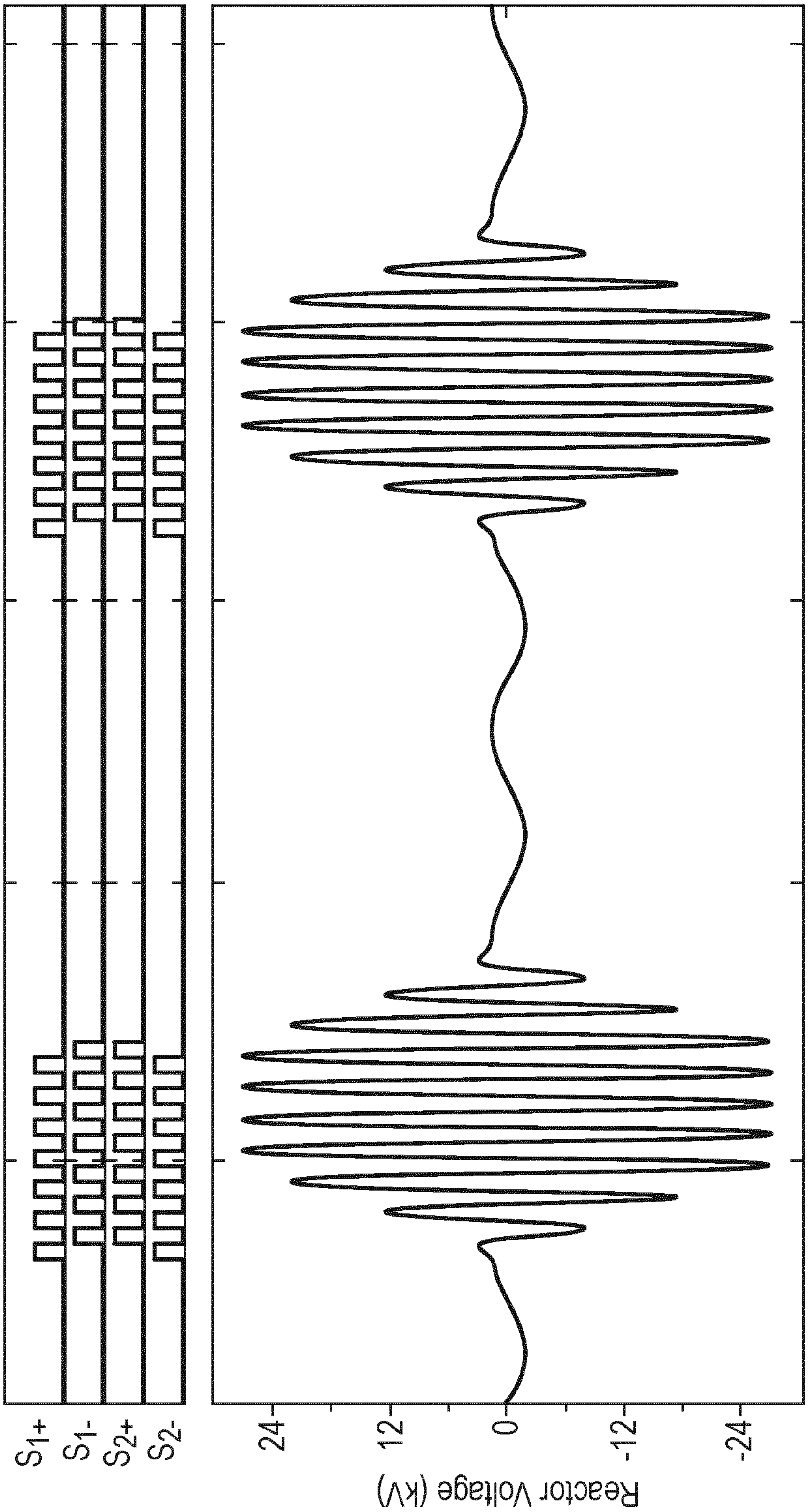
FIGS. 14*a* and 14*b* show example plots of switching sequence over time and resulting voltage over time.

The ringing occurs in the timer interval between pulse-trains. This can be seen in FIG. 14*a* as the wave between the two pulses in the lower plot. This is due to a standing wave that can become established within the circuit.

In order to minimise ringing, instead of having all the switches in the off state between the end of the second mode of a pulse-train and the start of the next pulse-train, a "freewheeling" interval is introduced in some examples.

Figure 14B:
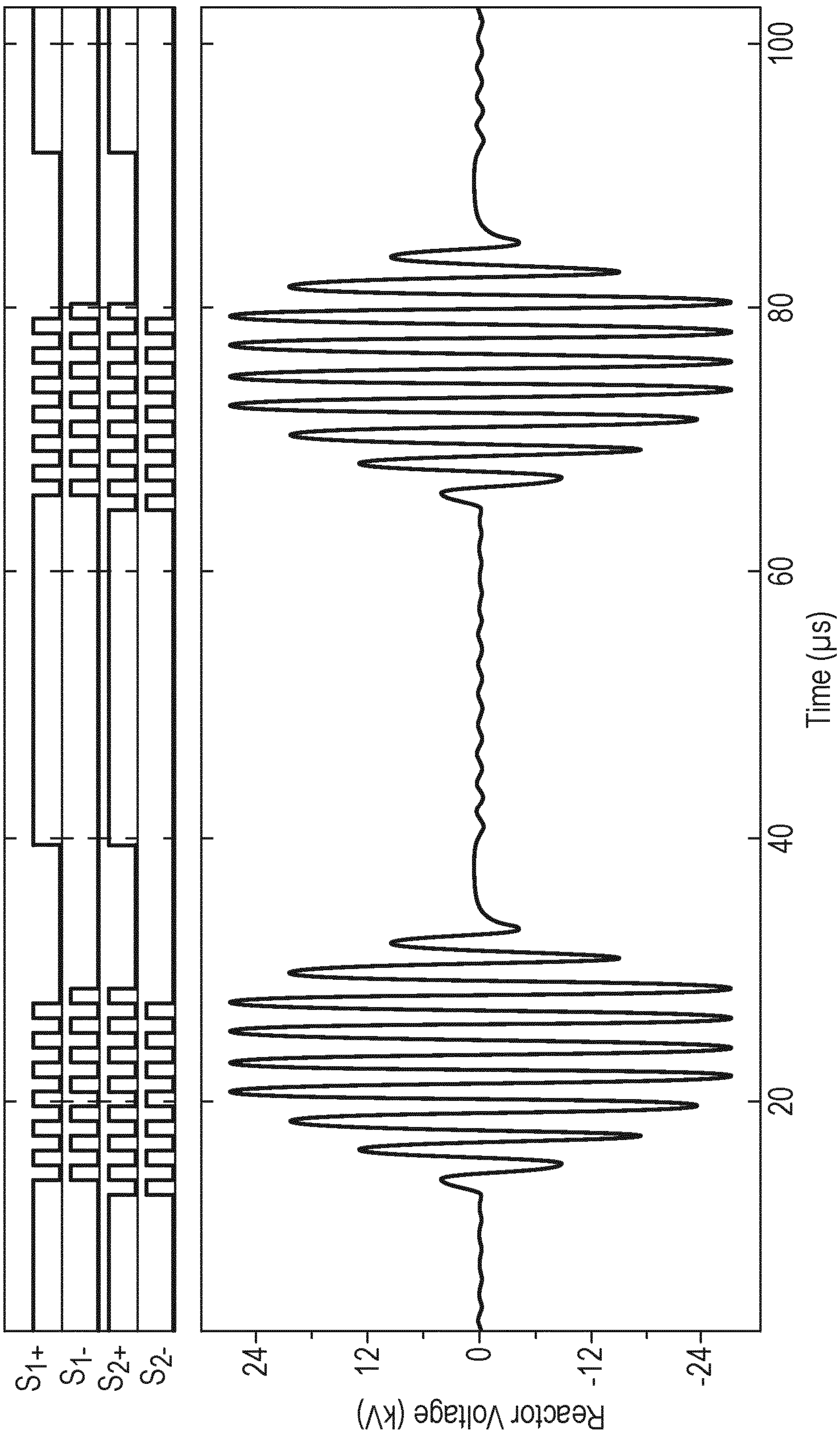

Such a freewheeling interval is shown in the upper plot in FIG. 14*b*. In this plot it can be seen that the high side switches, $S_{1+}$ and $S_{2+}$ are placed in the on state after the end of the third mode (i.e. the mode during which the resonant tank is discharged) of the first pulse-train shown in the lower plot of FIG. 14*b* until the start of the next pulse. This shorts the transformer winding (i.e. applies a voltage of approximately 0 V). The response to this in the system 1 is that the ringing is minimised/attenuated as can be seen by there being no ringing between the two pulses shown in the lower plot of FIG. 14*b* where there is a ringing between the two pulses shown in the lower plot of FIG. 14*a*.

The freewheeling interval is started after the resonant tank has been de-energised (i.e. after the remaining energy in the resonant tank after a pulse-train occurs has been transferred away from the resonant tank). As set out above, this is achieved by placing the high side switches in the on state while having the low side switches, $S_{1-}$ and $S_{2-}$, in the off stage. The same result can be achieved by placing the low side switches in the on state and the high side switches in the off stage instead.

In examples where an air-core transformer is used, when active energy recovery is not applied, ringing also occurs. This can be seen, for example, from the plots shown in FIG. 15.

Figure 15:
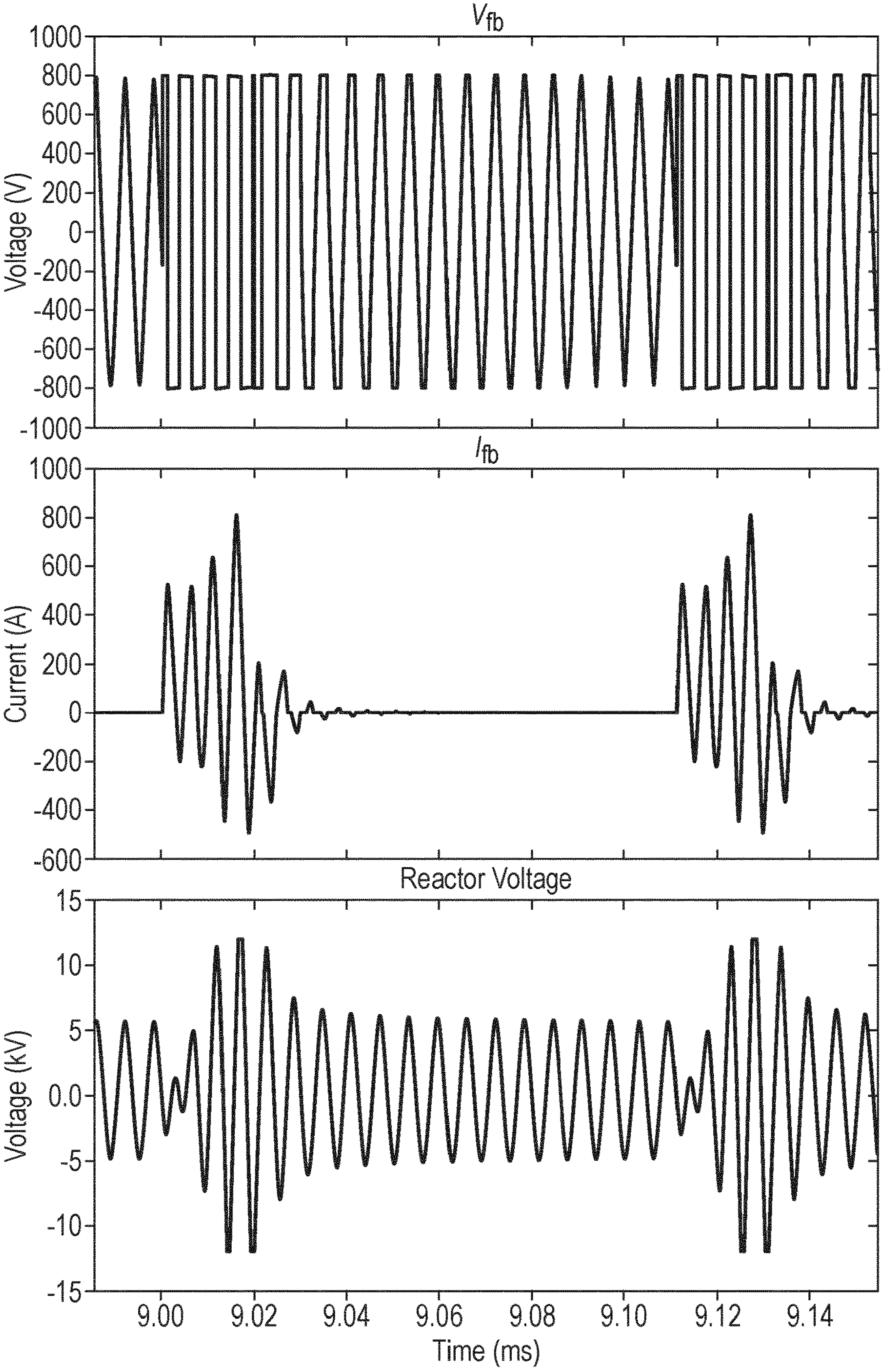
FIG. 15 shows example plots of resonant tank input voltage and current and resulting DBD device voltage against time without energy recovery.

In FIG. 15, three plots are shown. All the plots have time in milliseconds as their x-axis. The top plot shows voltage at the inverter terminals, $V_{fb}$, (i.e. the terminals connected to the transformer primary windings) against time. The middle plot shows the corresponding current at the inverter terminals, $I_{fb}$, against time. The bottom plot shows the voltage across the discharge gap that results from the voltage and current shown in the two other plots of the figure against time.

FIG. 15 shows two pulse-trains being provided by the inverter. The first pulse-train starts at about 9.00 ms. The pulse-train is provided (as is typical of examples according to an aspect disclosed herein) in the form of a square $V_{fb}$ waveform excitation. The initiation of the pulse-train causes charging in the resonant tank as can be seen by the ramping up of the amplitude in the inverter terminal current and the discharge gap voltage.

Once the resonant tank has charged to the threshold voltage, a discharge ignition event occurs at the discharge gap. This threshold in the example shown in FIG. 15 is about 10 kV.

The excitation is stopped shortly after this depending on the maximum number of discharge ignition events wanted. In the example shown in FIG. 15, this number is between one and three discharge ignition events. The time the excitation is stopped can be seen most clearly from the inverter terminal current plot. This shows a sudden drop in current amplitude from about 800 A during the discharge ignition event(s) to about 200 A at the maximum peak of the next cycle. This occurs at about time 9.02 ms, with the charging to the threshold voltage taking until about time 9.01 ms.

As can be seen from the inverter terminal voltage and current plots, the next pulse-train then starts at about time 9.11 ms. However, the voltage at the inverter terminals and the discharge gap can be seen in FIG. 15 as continuing to oscillate. Indeed, the amplitude of the voltage at the discharge gap is only reduced to about half the amplitude of the discharge threshold, so about 5 kV. However, this diminishes by about 1 to 2 kV in the period between the end of the excitation of the first pulse-train and the beginning of the next pulse-train.

Figure 16:
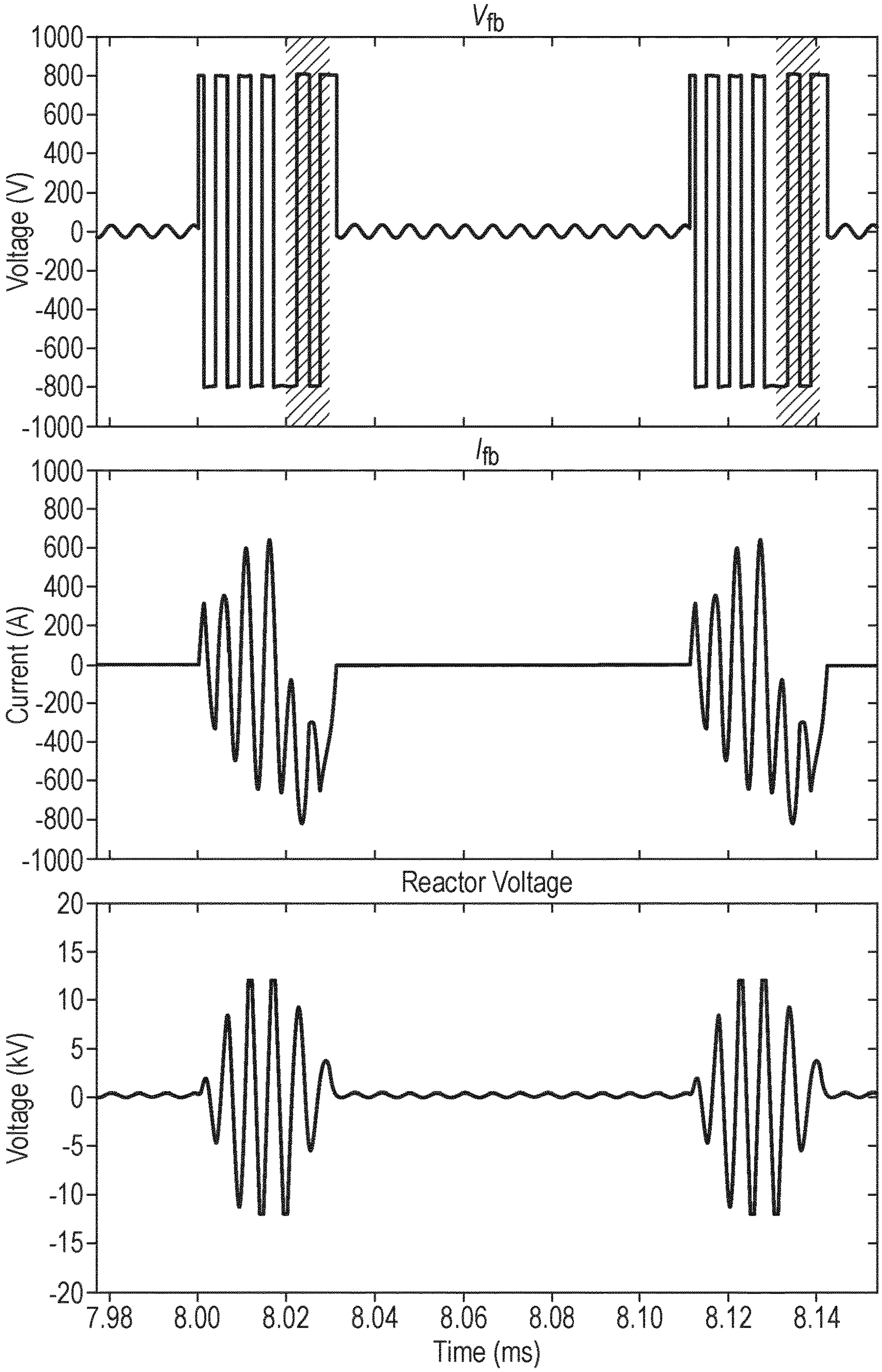
FIG. 16 shows example plots of resonant tank input voltage and current and resulting DBD device voltage against time with energy recovery.

Turning to FIG. 16, this shows the same three plots as in FIG. 15 of inverter terminal voltage, inverter terminal current and discharge gap voltage against time. In the example shown in FIG. 16, it can be seen from the inverter terminal plot that a pulse-train starts at time 8.00 ms. As can be seen from the inverter terminal current and discharge gap plots, the resonant tank is charged from this time to about time 8.01 ms. At about this time the discharge threshold is reached and a discharge ignition event occurs.

After the maximum number of discharge ignition events has occurred, which in the example of FIG. 16 is again between one and three discharge ignition events, the excitation is stopped. This occurs at about time 8.02 ms. At this point a phase shift of 180° is applied to the inverter terminal voltage for a period of about 0.01 ms until about time 8.03 ms. This drives the energy in the charged resonant tank out of the resonant tank. As noted above, in various examples, this energy is then stored. The driving of the energy out of the resonant tank can also be seen from the inverter terminal current plot, which instead of showing a current with a sinusoidal wave (of varying amplitude) centred on 0 A, the current wave shifts negative until the end of the voltage phase shift period.

Due to this active energy recovery when using an air-core transformer, it can be seen in FIG. 16 that the ringing between the end of the phase shift period at about time 8.03 ms and the beginning of the next pulse train at about time 8.11 ms is reduced. This reduction is to an amplitude of about 1 kV at the discharge gap and to about 50 V at the inverter terminals.

The invention claimed is:

1. A drive circuit for a dielectric barrier discharge device, the circuit comprising:

a power supply connectable in use across a dielectric discharge gap, the dielectric discharge gap providing a capacitance; and an inductance between the power supply and the dielectric discharge gap when connected thereby establishing a resonant tank in use, wherein power is provided in use to the tank in pulse-trains and only during a pulse-train, a pulse frequency of each pulse-train being tuneable in use to a resonant frequency of the tank, power provided by each pulse-train charging and maintaining the tank to a threshold at which discharge ignition occurs, discharge ignition events per pulse-train being limited to a maximum number based on the drive circuit being arranged in use to prohibit each pulse-train transferring power to the resonant tank after the maximum number has occurred, the drive circuit further comprising:

a power storage device connected across the power supply and arranged in use to accept and store power discharge from the tank after each pulse-train, wherein the drive circuit is arranged in use to shift a phase of the pulse-train by 180 degrees (°) after the maximum number of discharge ignition events has occurred.

2. The drive circuit according to claim 1, wherein the maximum number of discharge ignition events is between 1 and 5 events.

3. The drive circuit according to claim 1, further comprising a phase meter in communication with the tank and arranged in use to identify a phase shift in power provided to the tank during each pulse-train, the phase shift corresponding to occurrence of discharge ignition events, and wherein the drive circuit is further arranged in use to determine when the maximum number of discharge ignition events has occurred based on the number of pulses in the respective pulse-train since each respective discharge ignition event.

4. The drive circuit according to claim 1, further comprising an inverter between the power supply and the tank, the inverter being arranged in use to modulate supply of power to the tank from the power supply.

5. The drive circuit according to claim 4, wherein the pulse frequency of each pulse-train is a zero voltage switching frequency.

6. The drive circuit according claim 1, further comprising a transformer, secondary windings of which form part of the resonant tank, the transformer being a step-up transformer.

7. The drive circuit according to claim 6, wherein the circuit is arranged in use to short the primary transformer winding after each pulse-train.

8. The drive circuit according to claim 6, wherein at least a part of the inductance is provided by the transformer.

9. The drive circuit according to claim 8, wherein the transformer is an air-core transformer.

10. A system for providing dielectric barrier discharge, the system comprising:

a dielectric barrier discharge device having at least two electrodes with a gap for fluid therebetween defining a dielectric discharge gap, a dielectric layer being located between the at least two electrodes; and a drive circuit according to claim 1, the power supply of the drive circuit being connected across the dielectric discharge gap.

11. The system according to claim 10, wherein a sub-macroscopic structure is mounted on at least one electrode.

12. The system according to claim 10, wherein the at least two electrodes includes a first electrode and a second electrode, the dielectric layer is connected to the first electrode and a sub-macroscopic structure is connected to the second electrode.

13. The system according to claim 10, further comprising a controller connected to the drive circuit, the controller being arranged in use to adjust the power supplied to the tank of the drive circuit based on input provided to the controller.

14. The system according to claim 13, wherein the controller is arranged in use to adjust the pulse frequency, and/or the pulse-train repetition frequency, and/or the number of pulse-trains, and/or the number of pulses in a pulse-train.

15. The system according to claim 13, wherein the input includes voltage and current at an output of the drive circuit.

16. The system according to claim 15, wherein the controller is arranged in use to determine phase difference between the voltage and current.

17. A method of controlling discharge in a dielectric discharge device, the method comprising:

providing power to a resonant tank with a series of electrical pulse-trains, the pulse frequency of each pulse-train being tuned to a resonance frequency of the tank, the resonant tank being connected across a gap between electrodes in a dielectric discharge device, a capacitance of the tank being provided by the dielectric discharge device, power provided by each pulse-train charging and maintaining the tank to a threshold at which discharge ignition occurs;

providing a maximum number of discharge ignition events per pulse-train by prohibiting each pulse-train transferring power to the resonant tank after the maximum number of discharge ignition events has occurred;

prohibiting power transfer to the tank between pulse-trains;

for each pulse-train, discharging the resonant tank after the maximum number of discharge ignition events has occurred by changing a phase of the power provided by the respective pulse-train by 180°; and storing energy passed out of the resonant tank by the discharge.

18. The method according to claim 17, further comprising:

identify a phase shift in power provided to the tank during each pulse-train, the phase shift corresponding to occurrence of discharge ignition events; and determining when the maximum number of discharge ignition events has occurred based on the number of pulses since each respective discharge ignition event.

19. The method according to claim 17, further comprising modulating the pulse frequency, and/or frequency of pulse-trains, and/or number of pulse-trains in the series of electrical pulse-trains, and/or number of pulses in each pulse-train.

20. The method according to claim 17, wherein the pulse frequency of each pulse-train provided to the resonant tank is set by switching in a circuit between a power supply and the resonant tank.

* * * * *